(12) United States Patent
McPherson et al.

(10) Patent No.: US 12,222,183 B2
(45) Date of Patent: Feb. 11, 2025

(54) SMART ARCHERY BOW WITH PERFORMANCE MONITORING AND LEARNING FEATURES

(71) Applicant: MCP IP, LLC, Sparta, WI (US)

(72) Inventors: Mathew A. McPherson, Norwalk, WI (US); Mark J. Hayes, Onalaska, WI (US); Jon B. Simonds, Gainesville, FL (US); Jeffrey A. Ozanne, La Crosse, WI (US)

(73) Assignee: MCP IP, LLC, Sparta, WI (US)

( * ) Notice: Subject to any disclaimer, the term of this patent is extended or adjusted under 35 U.S.C. 154(b) by 260 days.

(21) Appl. No.: 17/836,486

(22) Filed: Jun. 9, 2022

(65) Prior Publication Data
US 2022/0404116 A1 Dec. 22, 2022

Related U.S. Application Data

(60) Provisional application No. 63/211,331, filed on Jun. 16, 2021.

(51) Int. Cl.
*F41B 5/00* (2006.01)
*F41B 5/14* (2006.01)
*G06F 3/14* (2006.01)
*F41B 5/10* (2006.01)

(52) U.S. Cl.
CPC ............. *F41B 5/1403* (2013.01); *F41B 5/14* (2013.01); *F41B 5/1476* (2013.01); *F41B 5/1484* (2013.01); *G06F 3/14* (2013.01); *F41B 5/105* (2013.01)

(58) Field of Classification Search
CPC ...... F41B 5/00; F41B 5/10; F41B 5/14; F41B 5/1476
See application file for complete search history.

(56) References Cited

U.S. PATENT DOCUMENTS

| | | |
|---|---|---|
| 6,257,220 B1 | 7/2001 | McPherson et al. |
| 6,382,201 B1 | 5/2002 | McPherson et al. |
| 7,337,773 B2 | 3/2008 | Simo et al. |
| RE42,842 E | 10/2011 | McPherson |
| 8,038,133 B2 | 10/2011 | McPherson |
| 8,286,871 B2 | 10/2012 | Bay |
| 8,316,551 B2 | 11/2012 | Gorsuch et al. |
| 8,408,195 B2 | 4/2013 | McPherson |
| 8,500,563 B2 | 8/2013 | Roman et al. |
| 8,529,383 B2 | 9/2013 | Donahoe |
| 9,046,317 B2 | 6/2015 | McPherson |
| 9,335,120 B2 | 5/2016 | Roman et al. |

(Continued)

*Primary Examiner* — John A Ricci
(74) *Attorney, Agent, or Firm* — FOLEY & LARDNER LLP

(57) ABSTRACT

A system for a smart bow includes an accelerometer, a gyroscope, a user interface, and processing circuitry. The accelerometer is configured to measure acceleration of the smart bow. The gyroscope is configured to measure orientation of the smart bow. The processing circuitry is configured to receive the acceleration and the orientation of the smart bow from the accelerometer and the gyroscope. The processing circuitry is configured to perform an analysis on the acceleration and the orientation of the smart bow to identify an action performed with the smart bow. The processing circuitry is configured to operate the user interface to display a result of the analysis.

20 Claims, 17 Drawing Sheets

(56) References Cited

U.S. PATENT DOCUMENTS

| | | |
|---|---|---|
| 9,605,923 B2 | 3/2017 | McPherson |
| 9,714,809 B1* | 7/2017 | Bond ........................ F41B 5/00 |
| 10,281,229 B2 | 5/2019 | Haynes et al. |
| 10,393,471 B2 | 8/2019 | McPherson et al. |
| 10,401,118 B2 | 9/2019 | Donahoe |
| 10,612,885 B2 | 4/2020 | Conger et al. |
| 10,871,356 B2 | 12/2020 | Ferguson |
| 11,105,593 B2 | 8/2021 | Ozanne |
| 2014/0338440 A1 | 11/2014 | Donahoe |
| 2019/0285492 A1 | 9/2019 | Dunham et al. |
| 2020/0062970 A1 | 2/2020 | McPherson |
| 2020/0116453 A1 | 4/2020 | Pell |
| 2020/0263956 A1 | 8/2020 | Allgaier |
| 2021/0341252 A1 | 11/2021 | McPherson |
| 2022/0196363 A1 | 6/2022 | Allgaier et al. |
| 2022/0236030 A1* | 7/2022 | Bushman ................ G01P 1/023 |

* cited by examiner

SMART ARCHERY BOW WITH PERFORMANCE MONITORING AND LEARNING FEATURES

CROSS-REFERENCE TO RELATED PATENT APPLICATION

This application claims the benefit of and priority to U.S. Provisional Application No. 63/211,331, filed Jun. 16, 2021, the entire disclosure of which is incorporated by reference herein.

BACKGROUND

The present disclosure relates generally to an archery bow. More particularly, the present disclosure relates to sensor systems for an archery bow.

SUMMARY

One implementation of the present disclosure is a system for a smart bow, according to some embodiments. In some embodiments, the system includes an accelerometer, a gyroscope, a user interface, and processing circuitry. In some embodiments, the accelerometer is configured to measure acceleration of the smart bow. In some embodiments, the gyroscope is configured to measure orientation of the smart bow. In some embodiments, the processing circuitry is configured to receive the acceleration of the smart bow from the accelerometer and the orientation of the smart bow from the gyroscope. In some embodiments, the processing circuitry is configured to perform an analysis on the acceleration and the orientation of the smart bow to identify an action performed with the smart bow. In some embodiments, the processing circuitry is configured to operate the user interface to display a result of the analysis.

In some embodiments, the accelerometer, the gyroscope, the user interface, and the processing circuitry are positioned within a modular housing that is fixedly coupled with a structure of the smart bow. In some embodiments, performing the analysis includes comparing at least one of time-series data of the acceleration or time-series data of the orientation of the smart bow to known time-series data of a particular action. In some embodiments, performing the analysis also includes determining that the particular action has been performed with the smart bow in response to the time-series data of the acceleration or the time-series data of the orientation of the bow matching the known time-series data of the particular action.

In some embodiments, the processing circuitry is configured to detect at least one of a shot action of the smart bow, a drawing action of a string of the bow, or a dryfire shot action based on the acceleration of the smart bow received from the accelerometer and the orientation of the smart bow received from the gyroscope. In some embodiments, the processing circuitry is configured to increment a shot counter in response to detecting the shot action, and increment a dryfire shot counter in response to detecting the dryfire shot action.

Another implementation of the present disclosure is a smart bow including an accelerometer, a gyroscope, a user interface, and processing circuitry, according to some embodiments. In some embodiments, the processing circuitry is configured to obtain acceleration data from the accelerometer and orientation data from the gyroscope. In some embodiments, the processing circuitry is configured to detect an action performed with the smart bow based on the acceleration data and the orientation data. In some embodiments, the processing circuitry is configured to operate the user interface to provide analytic data of the action performed with the smart bow. In some embodiments, the analytic data includes a characteristic of the action determined based on the acceleration data and the orientation data. In some embodiments, the smart bow also includes a modular housing within which the accelerometer, the gyroscope, the user interface, and the processing circuitry are positioned. In some embodiments, the modular housing is fixedly coupled with a structure of the smart bow.

In some embodiments, the modular housing is positioned within a handgrip of the smart bow. In some embodiments, the modular housing has a size less than or equal to 2 inches in height, less than or equal to 1 inch in width, and less than or equal to 0.75 inches in depth. In some embodiments, the processing circuitry is configured to wirelessly communicate with a smartphone or a remote system to provide data regarding the action performed with the smart bow.

In some embodiments, the processing circuitry is configured to operate according to multiple different modes. In some embodiments, the modes include a bow leveling mode for guiding a user to level the smart bow, a shot learning mode for learning a profile of an accurate shot, a training mode for training the user to improve archery skills, a tournament mode for recording data during a tournament, a hunting mode for recording data during a hunting trip, a vibration performance mode for determining and reporting an amount of vibration present at the smart bow, a power saving mode for reducing power consumption of the processing circuitry, and a game mode for training the user to improve archery in a gamified manner.

In some embodiments, the power saving mode is a sub-mode that can be activated when any of the bow leveling mode, the shot learning mode, the training mode, the tournament mode, the hunting mode, the vibration performance mode, or the game mode are active. In some embodiments, when the power saving mode is active, the processing circuitry is configured to detect inactivity of the smart bow based on the acceleration data and the orientation data, and disable one or more functions of the smart bow to conserve power consumption. In some embodiments, the processing circuitry is configured to, in response to detecting activity based on the acceleration data and the orientation data, enable the one or more functions of the smart bow.

In some embodiments, in the bow leveling mode, the processing circuitry is configured to operate the user interface to provide a notification to the user to level the smart bow about a first axis. In some embodiments, the processing circuitry is also configured to operate the user interface to provide a visual indication showing a current orientation of the smart bow about the first axis. In some embodiments, the processing circuitry is configured to determine, based on the orientation data obtained from the gyroscope, whether the smart bow is leveled about the first axis. In some embodiments, in response to the smart bow being level about the first axis, the processing circuitry is configured to operate the user interface to notify the user that the smart bow is level about the first axis, operate the user interface to provide a notification to the user to level the smart bow about a second axis, operate the user interface to provide a visual indication showing a current orientation of the smart bow about the second axis, and determine, based on the orientation data obtained from the gyroscope, whether the smart bow is leveled about the second axis. In some embodiments, in response to the smart bow being level about the second axis, the processing circuitry is configured to operate the user interface to notify the user that the smart bow is level about the second axis.

In some embodiments, in the shot learning mode, the processing circuitry is configured to operate the user interface to prompt the user to perform a shot using the smart bow, and obtain the acceleration data from the accelerometer and the orientation data from the gyroscope over a time period when the user performs the shot. In some embodiments, the processing circuitry is configured to obtain a user input indicating a shot quality of the shot, and perform the steps of operating the user interface, obtaining the acceleration data and the orientation data, and obtaining the user input a plurality of times to obtain training data. In some embodiments, the training data includes acceleration data and orientation data for a plurality of different shots, and an associated shot quality of each of the plurality of different shots. In some embodiments, the processing circuitry is configured to determine, based on the training data, a shot profile for the user, the shot profile configured to predict the shot quality based on inputs of the acceleration data and the orientation data.

In some embodiments, in the training mode, the processing circuitry is configured to obtain the acceleration data and the orientation data from the accelerometer and the gyroscope over a time period when the user performs a shot. In some embodiments, the processing circuitry is configured to identify one or more properties of the acceleration data and the orientation data, compare the one or more properties to one or more properties of a profile associated with an accurate shot of the user, and operate the user interface to provide an indication to the user regarding which of the one or more properties correspond to the one or more properties of the profile, which of the one or more properties do not match the one or more properties of the profile, and a deviation of the one or more properties that do not match the one or more properties of the profile. In some embodiments, the deviation is a difference between the one or more properties of the shot and the one or more properties of the profile.

In some embodiments, in the tournament mode, the processing circuitry is configured to identify one or more shots based on the acceleration data and the orientation data performed during a competition. In some embodiments, the processing circuitry is configured to determine one or more characteristics of each shot based on the acceleration data and the orientation data. In some embodiments, the processing circuitry is configured to determine a quality of each shot based on the acceleration data and the orientation data and a profile, and store the quality of each shot, the one or more characteristics of each shot, and the acceleration data and the orientation data of each shot in memory of the smart bow. In some embodiments, the processing circuitry is configured to generate a tournament report using the quality of each shot, the acceleration data, and the orientation data. In some embodiments, the processing circuitry is configured to provide the tournament report to the user in response to receiving a request from the user to view the tournament report.

In some embodiments, in the hunting mode, the processing circuitry is configured to identify one or more shots based on the acceleration data and the orientation data performed during a hunting trip. In some embodiments, the processing circuitry is configured to determine one or more characteristics of each shot based on the acceleration data and the orientation data. In some embodiments, the processing circuitry is configured to determine a quality of each shot based on the acceleration data and the orientation data and a profile. In some embodiments, the processing circuitry is configured to record a geographic location of each shot, store the quality of each shot, the one or more characteristics of each shot, the acceleration data and the orientation of each shot, and the geographic location of each shot in memory of the smart bow. In some embodiments, the processing circuitry is configured to generate a hunting report based on at least one of the quality of each shot, the one or more characteristics of each shot, the acceleration data and the orientation data of each shot, and the geographic location of each shot. In some embodiments, the processing circuitry is configured to provide the hunting report to the user in response to receiving a request from the user to view the hunting report.

In some embodiments, in the vibration performance mode, the processing circuitry is configured to determine, based on at least one of the acceleration data or the orientation data, a first degree of vibration of the smart bow when the smart bow is shot without an accessory installed. In some embodiments, the processing circuitry is configured to determine, based on at least one of the acceleration data or the orientation data, a second degree of vibration of the smart bow when the smart bow is shot with the accessory installed. In some embodiments, the processing circuitry is configured to operate the user interface to notify the user regarding the second degree of vibration or a relative increase or decrease of vibration of the bow between the first degree and the second degree of vibration.

In some embodiments, in the game mode, the processing circuitry is configured to obtain the acceleration data from the accelerometer and the orientation data from the gyroscope over a time period when the user performs at least one shot. In some embodiments, the processing circuitry is configured to identify one or more properties of the acceleration data and the orientation data. In some embodiments, the processing circuitry is configured to compare the one or more properties to one or more properties of a profile associated with an accurate shot of the user, generate a score for the user based on the comparison between the one or more properties of the at least one shot and the one or more properties of the profile, and operate the user interface to present the score to the user.

Another implementation of the present disclosure is a modular unit for a smart bow, according to some embodiments. In some embodiments, the modular unit includes an accelerometer, a gyroscope, a user interface, and processing circuitry. In some embodiments, the processing circuitry is configured to obtain acceleration data from the accelerometer and orientation data from the gyroscope, detect an action performed with the smart bow based on the acceleration data and the orientation data, operate the user interface to provide analytic data of the action performed with the smart bow. In some embodiments, the analytic data includes a characteristic of the action determined based on the acceleration data and the orientation data. In some embodiments, the modular unit also includes a housing within which the accelerometer, the gyroscope, the user interface, and the processing circuitry are positioned. In some embodiments, the modular unit is positioned within an inner volume of a handgrip of the smart bow and the user interface is accessible to a user of the smart bow.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Overview

Referring generally to the FIGURES, a smart bow (e.g., a compound bow, a recurve bow, etc.) includes accelerometers, gyroscopes, and processing circuitry. The accelerometers and gyroscopes are configured to obtain acceleration and orientation data of the smart bow during operation of the smart bow (e.g., as the smart bow is used to shoot an arrow). Various other types of sensors can be included in some embodiments in addition to or in place of the accelerometers and gyroscopes (e.g., magnetometers, inclinometers, etc.). The processing circuitry is configured to obtain the acceleration and orientation data from the accelerometers and the gyroscopes, perform an analysis based on the acceleration and orientation data, and operate a user interface to display results of the analysis. The processing circuitry can also be configured to wirelessly transmit the results of the analysis to a personal computer device or a remote system. The processing circuitry can be configured to operate according to different modes of operation, including, but not limited to, a leveling mode, a vibration performance mode, a power saving mode, an aim game mode, a shot learning mode, at raining mode, a tournament mode, or a hunting mode. In some embodiments, the processing circuitry is configured to detect different actions of the bow. In some embodiments, the processing circuitry is configured to obtain training data from the accelerometers and the gyroscopes over a training time period, and generate a user-specific shot profile for the user based on the training data. The processing circuitry can operate the user interface to provide suggestions to the user to improve their archery skills, and can track improvements of the user over time for progress reporting.

Bow Structure

Figure 1:
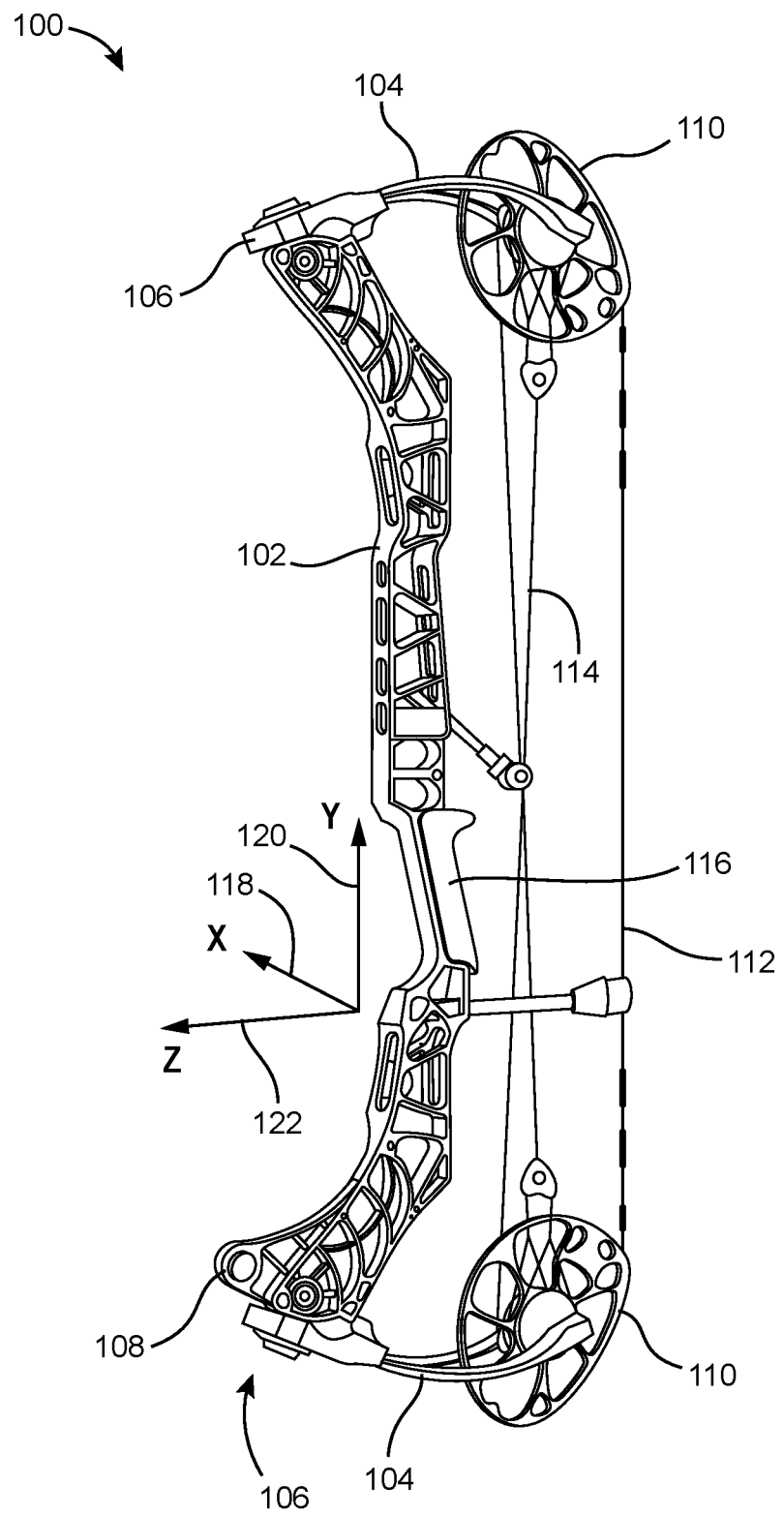
FIG. 1 is a perspective view of a bow, according to some embodiments.

Referring particularly to FIG. 1, a bow 100 is shown, according to some embodiments. The bow 100 is shown as a compound bow, but may be a recurve bow, according to some embodiments. The bow 100 includes a riser 102 that is coupled with at opposite ends with limbs 104 through limb cups 106, according to some embodiments. Cams 110 are positioned at ends of the limbs 104 and are rotatably coupled with the limbs 104, according to some embodiments. In some embodiments, the bow 100 also includes a damper 108 positioned at a distal end of the riser 102. In some embodiments, the bow 100 includes a string 112, a grip 116, and multiple cables 114 extending between the cams 110. In some embodiments, the string 112 extends between the cams 110. In some embodiments, the bow 100 is configured to fire or propel an arrow by releasably coupling a rear end of the arrow with the string 112, drawing the string 112, and releasing the string 112 to fire the arrow. Such operations may cause a vibration that is transmitted through structure of the bow 100.

As used herein, the term "X-axis" refers to an X-axis 118 as shown in FIG. 1. Similarly, the terms "Y-axis" and "Z-axis" refer to a Y-axis 120 and a Z-axis 122 as shown in FIG. 1.

Sensor and Processing System

Figure 2:
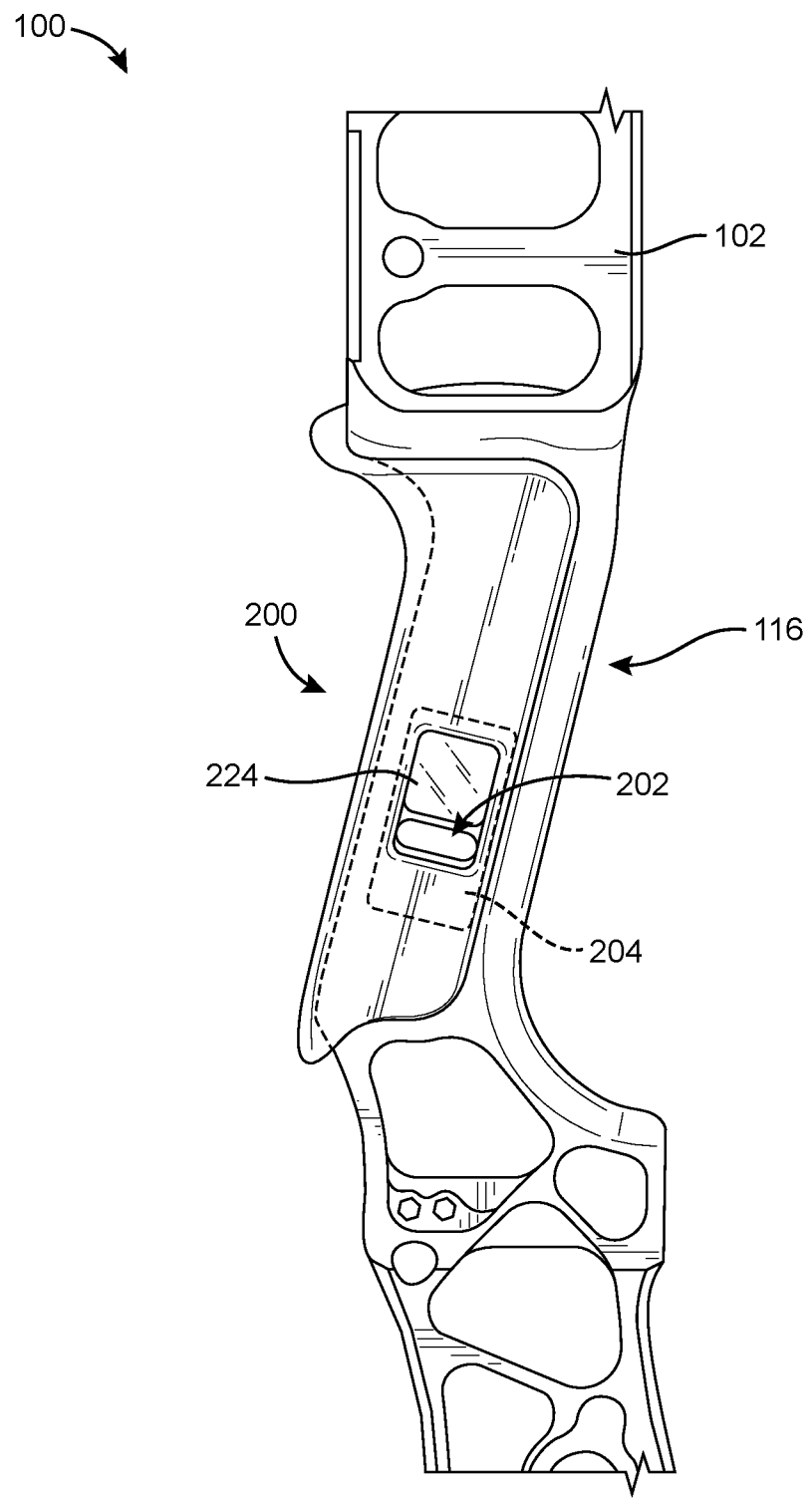
FIG. 2 is a side view of the bow of FIG. 1, including a sensor and processing system, according to some embodiments.

Referring now to FIG. 2, the bow 100 (e.g., a smart bow) may include a sensor and processing system 200, according to some embodiments. The bow 100 may be a compound bow, a recurve bow, etc. In some embodiments, the sensor and processing system 200 is implemented in a modular housing 204 that is coupled (e.g., fixedly, integrally formed, fastened, slip-fit, interlocked, press fit, etc.) with a handle of the bow 100. In some embodiments, the modular housing 204 is configured to contain, house, protect, cover, etc., the various components of the sensor and processing system 200 (e.g., the sensors, processing circuitry, etc., described herein) are positioned within the modular housing 204. In some embodiments, positioning the various electrical components of the sensor and processing system 200 facilitates installation of the sensor and processing system 200 (e.g., retro-fitting a non-smart bow with the sensor and processing system 200 to result in a "smart" bow, etc.). In some embodiments, the modular housing 204 is positioned within a handguard or within a plastic cover of the bow 100. In some embodiments, the modular housing 204 directly contacts, abuts, physically engages, etc., a structure of the bow 100 so that vibrations which may travel through the structure of the bow 100 are transferred to the modular housing 204 (e.g., for detection and processing). In some embodiments, the modular housing 204 has a size that is less than or equal to 2 inches in height, less than or equal to 1 inch in width, and less than or equal to 0.75 inches in depth. In some embodiments, the modular housing 204 has a size that is less than or equal to 1.75 inches in height, less than or equal to 0.75 inches in width, and less than or equal to 0.5 inches in depth. In some embodiments, the modular housing 204 has a size that is less than or equal to 1.5 inches in height, less than or equal to 0.7 inches in width, and less than or equal to 0.4 inches in depth. In some embodiments, the sensor and processing system 200 is packaged in the modular housing 204 and positioned within a pocket of the structure of the bow 100 within a grip (e.g., grip 116) of the bow 100 (e.g., within a portion that the user grasps with one hand when firing the bow 100).

In some embodiments, the sensor and processing system 200 is configured for use with a bow having the structure of the bow 100 as described in greater detail above with reference to FIG. 1. In some embodiments, the sensor and processing system 200 is usable with a bow (e.g., the bow 100) that includes any of the structure or features described in U.S. patent application Ser. No. 17/246,166 titled "Archery Bow with Centered Cable Guard" filed Apr. 30, 2021, and/or U.S. Pat. No. 10,393,471 titled "Archery Bow Riser with Stabilizing Damper" issued Aug. 27, 2019, the entire disclosures of both of which are incorporated by reference herein.

Figure 3:
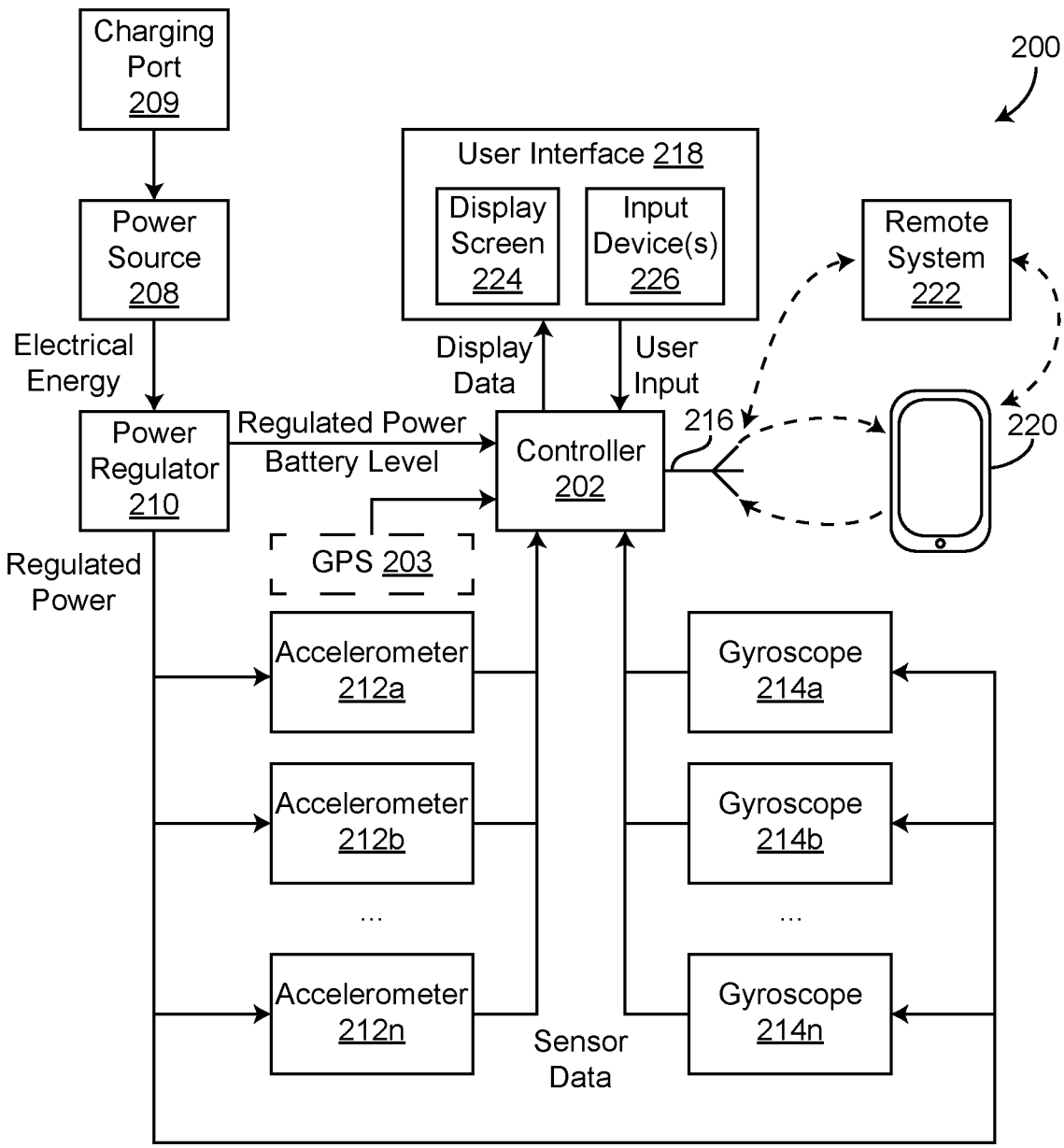
FIG. 3 is a block diagram showing the sensor and processing system in greater detail, according to some embodiments.

Referring particularly to FIGS. 2 and 3, the sensor and processing system 200 includes a user interface 218, a controller 202, accelerometers 212, and gyroscopes 214, according to some embodiments. In some embodiments, the user interface includes a display screen 224 (e.g., a touchscreen, a liquid crystal display (LCD) screen, a light emitting diode (LED) display screen, etc.) and one or more input devices 226 (e.g., one or more buttons, switches, knobs, levers, latches, pressure sensors, etc.). In some embodiments, the display screen 224 is configured to provide visual and/or aural information or data to a user of the bow 100. For example, the display screen 224 can be communicably coupled with the controller 202 and can be configured to display a visual representation of any of the data, parameters, sensor data, analytic data, reports, etc., described herein with reference to the sensor and processing system 200. In some embodiments, the input devices 226 of the user interface 218 can be operated, selected, adjusted, etc., by the user to provide one or more user inputs to the controller 202 (e.g., to facilitate operation of the sensor and processing system 200). In some embodiments, the sensor and processing system 200 also includes a power source 208 (e.g., a battery, a capacitor, a chemical energy storage device, an electrical energy storage device, etc.) configured to store and discharge electrical energy to a power regulator 210 of the sensor and processing system 200. In some embodiments, the power regulator 210 is configured to obtain electrical energy from the power source 208, regulate the electrical energy (e.g., adjust a current, voltage, etc., thereof) and provide regulated power to any of the accelerometers 212, the gyroscopes 214, the controller 202, the user interface 218, etc.

In some embodiments, the sensor and processing system 200 includes a wireless transceiver 216 configured to facilitate wireless communication between the controller 202, or more generally, components of the sensor and processing system 200 that are positioned at the bow 100, and one or more remote devices, systems, etc. The wireless transceiver 216 may include, for example, an antenna that extends from the sensor and processing system 200 or is contained at least partially within the sensor and processing system 200 (e.g., inside the housing, embedded or etched onto a surface of the housing, etc.). In some embodiments, the wireless transceiver 216 facilitates bi-directional wireless communications between the controller 202 and a remote system 222 (e.g., a server, a distributed computing system, a cloud computing system, etc.) and/or a personal computer device 220 (e.g., a smartphone, a computer, etc.). In some embodiments, the wireless transceiver 216 is configured to facilitate wireless communications according to a variety of protocols such as radio (e.g., AM or FM) transmission, cellular communications, Wi-Fi, Bluetooth, LoRa, ZigBee, near field communications (NFC), ANT communications protocol, etc.

In some embodiments, the wireless transceiver 216, the controller 202, the accelerometers 212, the gyroscopes 214, the power regulator 210, the power source 208, and the user interface 218 are all positioned within the modular housing 204. In some embodiments, the modular housing 204 facilitates protecting the various components described herein so that the components can be provided as a single assembly or unit when installed on the bow 100. In some embodiments, one or more components of the sensor and processing system 200 may be located remote from the bow 100 (e.g., may be part of the remote system 222 and/or the personal computer device 220). For example, the accelerometers 212 and gyroscopes 214 may be located at the bow 100 and may communicate acceleration data and orientation data to the remote system 222 and/or the personal computer device 220 via the wireless transceiver 216, whereas the user interface 218 and the controller 202 may be part of the remote system 222 and/or the personal computer device 220. It is contemplated that various components of the bow 100 and the sensor and processing system 200 can be part of the same device (e.g., all located at the bow 100) or distributed across multiple discrete systems or devices in various embodiments.

Referring particularly to FIG. 3, the accelerometers 212 can include any number of accelerometers $212a \ldots 212n$, according to some embodiments. In some embodiments, the accelerometers 212 are three-axis accelerometers that are configured to sense, detect, or obtain acceleration sensor data of the bow 100 along or about three different axes (e.g., three perpendicular axes). Accelerometers 212 can be configured to measure acceleration of the bow 100 along any of the axes. For example, the accelerometers 212 may provide acceleration data indicating acceleration in an X-axis direction, Y-axis direction, Z-axis direction, or any combination thereof (e.g., linear acceleration data). The linear acceleration data can be used to determine a change in position or velocity of the bow 100 in three-dimensional space. In some embodiments, the accelerometers 212 are configured to measure acceleration of the bow 100 about a Z-axis (e.g., tilt acceleration), acceleration of the bow 100 about an X-axis (e.g., elevation acceleration), and acceleration of the bow 100 about a Y-axis (e.g., azimuth acceleration). The acceleration data indicating tilt or rotation of the bow 100 about the X-axis, Y-axis, and Z-axis (e.g., angular acceleration data) can be used to determine the orientation of the bow 100. Accordingly, the acceleration data from the accelerometers 212 may include linear acceleration data and/or angular acceleration data that can be used to determine the position or velocity of the bow 100 and/or an orientation or angular velocity of the bow 100.

The gyroscopes 214 can include any of number of gyroscopes 214a . . . 214n, according to some embodiments. In some embodiments, the gyroscopes 214 have three degrees of freedom. In some embodiments, the gyroscopes 214 are configured to measure angular orientation or position of the bow 100 about the Z-axis (e.g., the tilt position), angular orientation or position of the bow 100 about the X-axis (e.g., elevation position), and angular orientation or position of the bow 100 about the Y-axis (e.g., azimuth position). In some embodiments, the accelerometers 212 and the gyroscopes 214 provide sensor data of the measured accelerations and angular orientations of the bow 100 to the controller 202 in real-time for processing and use by the controller 202. The accelerometers 212 and the gyroscopes 214 can obtain motion data, acceleration data, angular orientation or position data, etc., according to some embodiments. The controller 202 can use the acceleration data from the accelerometers 212 and/or the gyroscopes 214 to determine the orientation of the bow 100. Accordingly, while the gyroscopes 214 are described as measuring the orientation of the bow 100 and providing orientation data, it should be understood that the acceleration data from the accelerometers 212 can also or alternatively be used by the controller 202 to determine the orientation of the bow 100 in some embodiments (e.g., by measuring angular acceleration of the bow 100 and estimating the orientation of the bow 100 based on the angular acceleration data).

In some embodiments, the sensor and processing system 200 also includes a global positioning system (GPS) sensor 203. In some embodiments, the GPS sensor 203 is optional. In some embodiments, the GPS sensor 203 is configured to communicate wirelessly (e.g., via its own wireless transceiver, or via the wireless transceiver 216 of the controller 202) to determine a geographical position and/or geographical orientation of the bow 100. In some embodiments, the GPS sensor 203 is also positioned within the modular housing 204. In some embodiments, the GPS sensor 203 is a component of the personal computer device 220 and the controller 202 is configure to obtain GPS location data from the personal computer device 220 via the wireless transceiver 216.

In some embodiments, the sensor and processing system 200 also includes a charging port 209 to facilitate electrically coupling the power source 208 with an external or charging power source (e.g., a wall outlet, a battery bank, etc.). In some embodiments the power sources 208 is a rechargeable power source such as a rechargeable Lithium Ion battery. In some embodiments, the charging port 209 is accessible from an exterior of the modular housing 204 to facilitate a wired connection between the external power source and the power source 208 of the sensor and processing system 200.

In some embodiments, the bow 100 includes additional sensors, sensing devices, units, measurement devices, etc. For example, the bow 100 can include a rotary potentiometer, a rotational sensor, etc., positioned on the cams 110 configured to measure an amount of draw of the string 112. The bow 100 can include strain gauges, accelerometers, one or more magnetometers, inclinometers, light sensors, light emitting diodes (LEDs), etc., or any other sensor configured to obtain input data regarding use of the bow 100, or any other output device for providing alerts to the user. For example, the bow 100 may include speakers or aural alert devices to provide aural notifications to the user.

Figure 4:
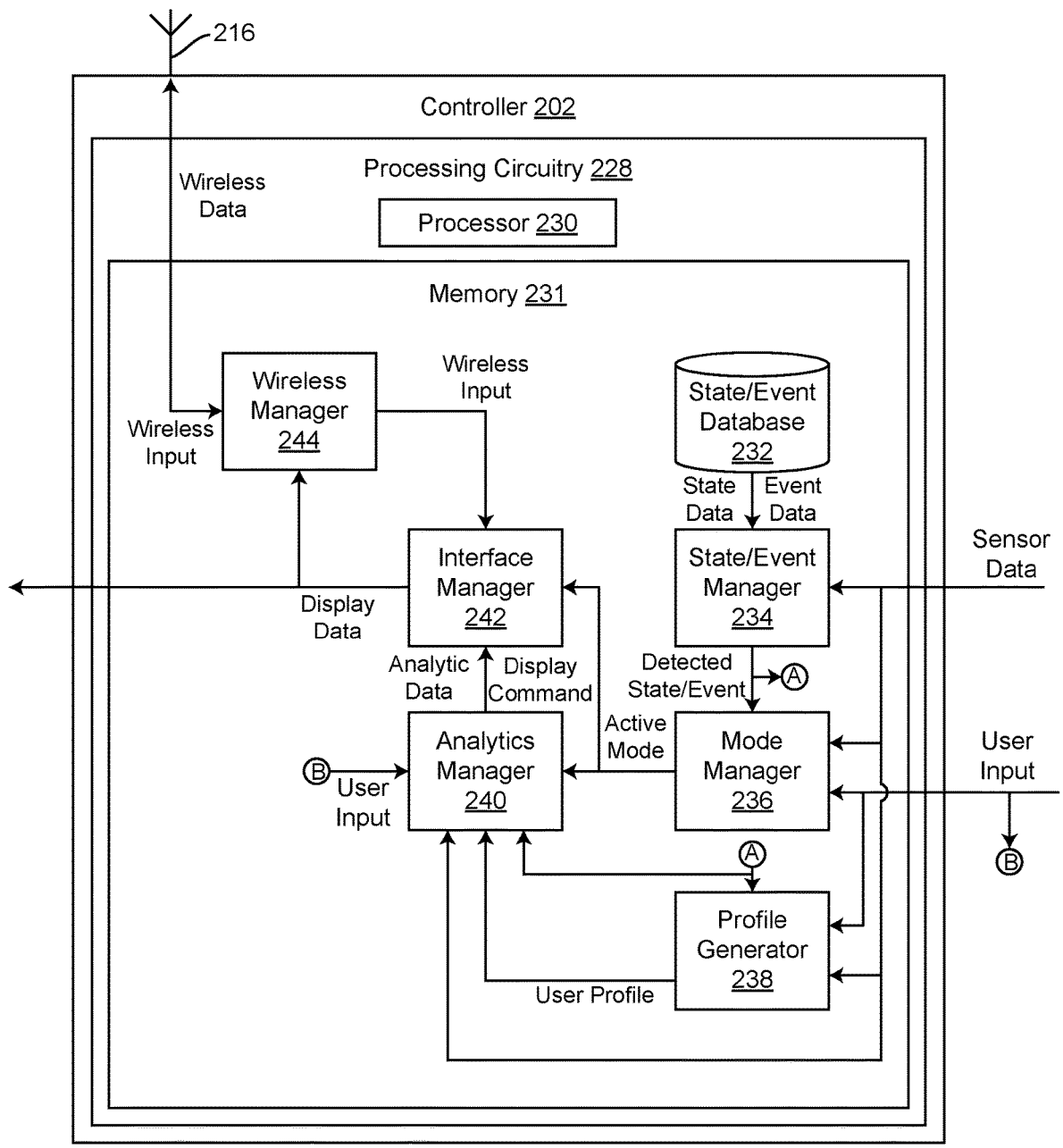
FIG. 4 is a block diagram of a controller of the sensor and processing system of FIG. 3 in greater detail, according to some embodiments.

Referring particularly to FIG. 4, the controller 202 is shown in greater detail, according to some embodiments. In some embodiments, the controller 202 includes processing circuitry 228 including a processor 230 and memory 231. Processing circuitry 228 can be communicably connected to a communications interface such that processing circuitry 228 and the various components thereof can send and receive data via the communications interface. Processor 230 can be implemented as a general purpose processor, an application specific integrated circuit (ASIC), one or more field programmable gate arrays (FPGAs), a group of processing components, or other suitable electronic processing components.

Memory 231 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 231 can be or include volatile memory or non-volatile memory. Memory 231 can include database components, object code components, script components, or any other type of information structure for supporting the various activities and information structures described in the present application. In some embodiments, memory 231 is communicably connected to processor 230 via processing circuitry 228 and includes computer code for executing (e.g., by processing circuitry 228 and/or processor 230) one or more processes described herein.

Referring still to FIG. 4, the memory 231 includes a state/event manager 234, a state/event database 232, a mode manager 236, a profile generator 238, an analytics manager 240, an interface manager 242, and a wireless manager 244, according to some embodiments. In some embodiments, the state/event manager 234, the mode manager 236, the profile generator, and the analytics manager 240 are configured to obtain the sensor data from the accelerometers 212 and the gyroscopes 214. In some embodiments, the mode manager 236, the profile generator 238, and the analytics manager 240 are also configured to obtain or receive one or more user inputs provided to the controller 202 via the user interface 218 for use in performing their respective functionalities.

The state/event manager 234 is configured to use the sensor data obtained from the accelerometers 212 and the gyroscopes 214 (e.g., real-time data, time series data of the accelerometers 212 and gyroscopes 214, etc.) to detect, determine, identify, etc., a state of the bow 100 or an event that has occurred at the bow 100. For example, the state/event manager 234 can be configured to detect if a shot event or a dryfire event has occurred at the bow 100 based on the sensor data provided by the accelerometers 212 and the gyroscopes 214. In some embodiments, the state/event manager 234 is configured to obtain state data or event data from the state/event database 232. The state data or the event data from the state/event database 232 can be a series of sensor data or datasets (e.g., angular acceleration data about the X, Y, and Z axes, angular orientation data over time about the X, Y, and Z axes, etc.) that is representative or indicative of a particular event or state. In some embodiments, the state/event manager 234 is configured to obtain data indicative of multiple different events or states. The state/event manager 234 can compare the sensor data obtained from the accelerometers 212 and/or the gyroscopes 214 to the data indicative of the multiple different events or states, and, based on the comparison, identify which of the different events or states has occurred, according to some embodiments. In some embodiments, the state/event manager 234 is configured to determine which of the different datasets the sensor data obtained from the accelerometers 212 and/or gyroscopes 214 best fits, and identify what type of event has occurred at the bow 100 or in which state the bow 100 is currently.

In some embodiments, the different states or events of the bow 100 that can be identified include a shooting event, a dryfire event, a transportation state, an aiming or steadying state, a drawing state/event, etc. It should be understood that the different states or events described herein should not be understood as limiting, and any number of states, events, occurrences, etc., that may be typical of operation of the bow 100 can be detected. Each of the different detectable states or events may have an associated one or more datasets of the sensor data stored in the state/event database 232 for use by the state/event manager 234 in determining which of the states or events the sensor data (e.g., real-time sensor data) corresponds to, thereby facilitating automatic detection of a current state or event of the bow 100. The state/event manager 234 can use an analytical approach, using a predetermined set of instructions to detect what event has occurred at the bow 100 or what state in which the bow 100 is currently, according to some embodiments. In some embodiments, the state/event manager 234 is configured to use a neural network or a machine learning technique (e.g., a pattern recognition technique) to detect what event has occurred at the bow 100 or what state in which the bow 100 is currently. In some embodiments, the neural network or machine learning technique is pre-trained before being implemented on the bow 100. For example, the neural network or machine learning technique can be provided training data including multiple datasets of the sensor data, and a corresponding event or state, prior to implementation on the bow 100. In some embodiments, the neural network or machine learning technique is implemented on the bow 100 in an un-trained state, and the state/event manager 234 initiates a training sequence or training time period to collect training data from the accelerometers 212 and the gyroscopes 214, while prompting the user to perform different events at the bow 100 or to transition the bow 100 into different states (e.g., draw the string, steady the bow, release the string to perform a "fire" event, etc.). In this way, the state/event manager 234 may read/write data with the state/event database 232 to facilitate training of the neural network using sensor data obtained from a particular instantiation of the neural network or implementation of the sensor and processing system 200 on a particular bow, for a particular user, etc. In some embodiments, the neural network is pre-trained, and calibrated based on additionally implemented training sequences, training routines, etc., during which the sensor data is obtained from the accelerometers 212 and the gyroscopes 214 and associated with a corresponding event or state.

The state/event manager 234 outputs a detected state or event to any of the mode manager 236 or the profile generator 238 for use in performing their functionality, according to some embodiments. In some embodiments, the state/event manager 234 also provides the detected state or event to the analytics manager 240 and/or the interface manager 242 (e.g., so that the analytics manager 240 can count a number of "shot" events, increment a shot counter, increment a dryfire counter, etc., and so that the interface manager 242 can operate the display screen 224 of the user interface 218 to display the detected states/events or to display data that includes or is based on the detected states/events).

Referring still to FIG. 4, the mode manager 236 is configured to receive the detected state/event from the state/event manager 234, the sensor data from the accelerometers 212 and the gyroscopes 214, and the user input from the input device(s) 226, and determine which of multiple modes into which the controller 202 should be transitioned. For example, the mode manager 236 may receive a user input or a command to transition the controller 202 between a variety of different modes. In some embodiments, the mode manager 236 receives the detected state or event and, based on the detected state or event, determines which of the modes into which to automatically transition the controller 202, and thereby the sensor and processing system 200. The mode manager 236 can also use the sensor data provided by the accelerometers 212 and/or the gyroscopes 214 to automatically determine which of the modes into which the controller 202 and thereby the sensor and processing system 200 (or more generally, the bow 100) should automatically be transitioned. When the mode manager 236 determines which of the modes (e.g., predetermined modes) the controller 202 should be transitioned into, the mode manager 236 can provide the determined mode to the analytics manager 240 and the interface manager 242 as an active mode, to thereby configure the analytics manager 240 and/or the interface manager 242 to operate according to the active mode. In some embodiments, the analytics manager 240 and the interface manager 242 are configured to receive different operating or configuration parameters from the mode manager 236 in addition to the active mode, and the analytics manager 240 and the interface manager 242 use the operating or configuration parameters and active mode to operate accordingly.

Referring still to FIG. 4, the profile generator 238 is configured to receive the sensor data from the accelerometers 212 and the gyroscopes 214, the detected state or event from the state/event manager 234, and the user input from the input devices 226. In some embodiments, the profile generator 238 is configured to use any of the inputs described herein to generate a user profile. In some embodiments, the user profile is a unified dataset or profile that includes sample data for each of the different types of actions, events, personal data regarding the user, etc. In some embodiments, the profile generator 238 is configured to provide the user profile to the analytics manager 240 and/or the interface manager 242. In some embodiments, the profile generator 238 is configured to provide the use profile to the wireless manager 244 for use in transmission to the remote system 222 or the personal device 220 via the wireless transceiver 216.

Referring still to FIG. 4, the analytics manager 240 is configured to receive the active mode from the mode manager 236, the user profile from the profile generator 238, the sensor data from the accelerometers 212 and the gyroscopes 214, and the user input from the input devices 226. The analytics manager 240 can be configured to perform a high-level analysis or progress tracking based on the received inputs, according to some embodiments. In some embodiments, the analytics manager 240 is configured to generate reports, training protocols, aggregate data, etc., shown as analytic data. In some embodiments, the analytics manager 240 is configured to provide the analytic data to any of the interface manager 242 or the wireless manager 244 for display on the display screen 224 or for transmission via the wireless transceiver. In some embodiments, the analytics manager 240 is also configured to provide a display or a transmission command to the interface manager 242 or the wireless manager 244, respectively, indicating which of the analytic data should be displayed on the display screen 224 or transmitted via the wireless transceiver 216.

State or Event Detection

Figure 7:
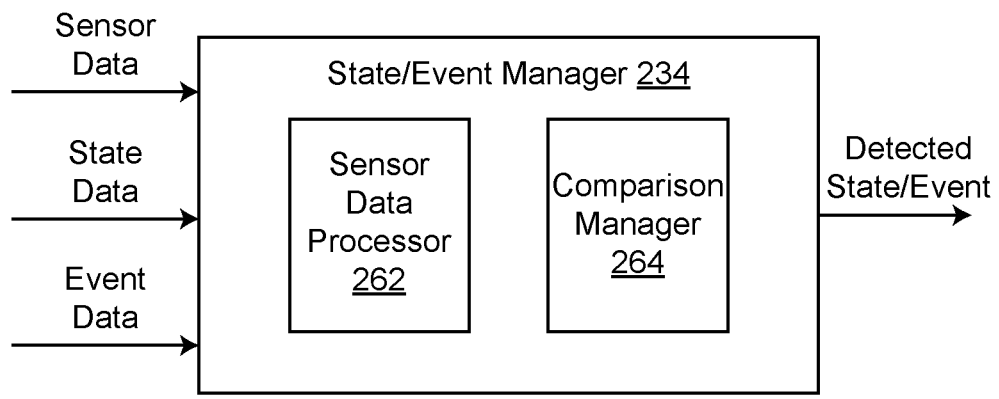
FIG. 7 is a block diagram of a state or event manager of the controller of FIG. 4 in greater detail, according to some embodiments.

Referring particularly to FIG. 7, the state/event manager 234 is configured to obtain the sensor data from the accelerometers 212 and the gyroscopes 214, and the state data and the event data from the state/event database 232 for one or more events, according to some embodiments. In some embodiments, the state/event manager 234 can include a sensor data processor 262 and a comparison manager 264. In some embodiments, the sensor data processor 262 is configured to obtain the sensor data, and process the sensor data for use by the comparison manager 264. The sensor data processor 262 can be configured to identify one or more parameters of the sensor data, convert the sensor data to time-series data if necessary, etc. For example, the sensor data processor 262 may calculate an average angular orientation of the bow 100 about any of the X-axis, the Y-axis, or the Z-axis over a predetermined time period, identify a maximum or average angular acceleration of the bow 100 about any of the X-axis, the Y-axis, or the Z-axis over a time period, a measured amount of signal noise in any of the sensor data obtained from the accelerometers 212 or gyroscopes 214, a calculated variance or deviation of any of the angular accelerations or angular orientations of the bow 100 about the X, Y, or Z axes, etc. In some embodiments, the sensor data processor 262 is configured to perform a regression technique on the sensor data obtained from the accelerometers 212 or the gyroscopes 214 to generate a curve fit or equation for the sensor data (e.g., a time-series equation). In some embodiments, the sensor data processor 262 is configured to determine a time rate of change (e.g., an angular velocity) of the bow 100 based on a time derivative of the sensor data obtained from the gyroscopes 214, or a time integral of the sensor data obtained from the accelerometers 212.

In some embodiments, the state data or the event data includes a dataset of similar types of data for any of the sensor data obtained from the accelerometers 212 or the gyroscopes 214. For example, the state data or the event data may include a dataset of time-series acceleration and/or angular orientation data, time-series angular velocity, average or maximum angular accelerations about any of the X, Y, or Z axis, an expected amount of signal noise, an expected deviation or variance of the angular acceleration or angular orientation about any of the X, Y, or Z axes, a characteristic shape or trend of time-series angular orientation or angular acceleration data, etc., that is representative of a corresponding event or state of the bow 100. In some embodiments, the comparison manager 264 is configured to use the datasets of the state data or the event data, and compare the sensor data or the outputs of the sensor data processor 262 to the datasets of the state or the event data to determine which of the datasets the sensor data and/or the outputs of the sensor data processor 262 of the sensor data corresponds. In some embodiments, if the comparison manager 264 determines that one of the datasets of the state data or event data matches with the sensor data or the outputs of the sensor data processor 262, the comparison manager 264 determines that the event or state associated with the matching dataset is the type of event that has occurred at the bow 100 or the state that the bow 100 is currently in. In some embodiments, the datasets of the state data or the event data are representative data or "templates" that indicate an expected set of sensor data for performance of different events at the bow 100 or different states of the bow 100. In this way, the comparison between the sensor data obtained from the accelerometers 212 and/or the gyroscopes 214 and the datasets of state data or the event data can be used for event identification at the bow 100.

For example, the state/event manager 234 may detect when a string of the bow 100 is drawn (e.g., a bow-draw event), when the bow 100 is subsequently aimed (e.g., by monitoring the sensor data and using any of the techniques described herein to identify that the sensor data resembles a known set of sensor data associated with aiming the bow 100), and when the bow 100 is fired (e.g., by measuring rapid acceleration changes or vibrations of the bow 100 as measured by the accelerometers 212)

In some embodiments, the comparison manager 264 is configured to use an analytical technique to detect the state or event that occurs at the bow 100 based on the sensor data. For example, the comparison manager 264 may use a set of instructions or a predetermined set of particular parameters, properties, estimates, etc., of the sensor data, and compare the sensor data or calculated parameters, variables, properties, etc., thereof, to corresponding parameters, properties, estimates, variables, etc., of the state data or the event data, according to the analytical technique to detect the state or event. For example, if drawing of the bowstring is typically accompanied by a rapid jitter of angular orientation of the bow 100 or a rotation of the bow 100 to a particular angular orientation (e.g., in an upwards direction) and then returned to a generally level or steadied angular orientation, as measured by the gyroscopes 214, the comparison manager 264 may detect that a draw has occurred based on the characteristic properties of the sensor data matching expected properties of a string draw event data. Similarly, if an "aiming" event or state typically follows a drawing of the bowstring event, and is typically accompanied by a relatively constant or unvarying angular orientation of the bow 100 (e.g., as the user aims the bow), the comparison manager 264 can identify that the sensor data indicates the bow 100 is being aimed, based directly on the sensor data indicating a low amount of variance in the angular orientation of the bow 100 following a drawing of the bowstring event. Finally, if a "firing" event is typically accompanied by a spike in angular acceleration (e.g., about the X, Y, or Z axes) having a particular magnitude (e.g., as indicated by event data for a "firing" event), the comparison manager 264 can analyze spikes in the angular acceleration of the bow 100 (e.g., the sensor data) to identify or detect that a "firing" event has occurred. It should be understood that any of the state data or event data described herein can be tailored or model specific to the bow 100. For example, heavier bows with a lower bowstring draw weight, or bows with improved damping designs, may undergo less vibration than lighter bows with relatively high bowstring draw weight. Appropriate state data or event data may be retrieved by the state/event manager 234 based on weight, geometry, properties, model, right or left-handedness of the user, etc. Such properties of the bow 100 or the user may be known and stored in the memory 231 of the controller 202 and can be used by the state/event manager 234 for use in retrieval of appropriate state data and event data from the state/event database 232.

In some embodiments, the comparison manager 264 is configured to use a machine learning technique to detect the state or event that occurs at the bow 100 based on the sensor data. For example, the comparison manager 264 can include a neural network (e.g., a convolutional neural network (CNN), a recurrent neural network (RNN), a perceptron neural network, a feedforward neural network, a multi-layer perceptron neural network, a radial basis functional neural network, a Long Short-Term Memory (LSTM) neural network, etc.) that is trained based on angular orientation, acceleration, etc., of various bows performing different actions or events to predict an event or state of the bow 100 using the sensor data provided by the accelerometers 212 and/or the gyroscopes 214. In some embodiments, the neural network of the comparison manager 264 is configured to select between a predetermined number of expected events or states of the bow 100, and use the sensor data provided in real-time from the accelerometers 212 and/or the gyroscopes 214 to detect an event that has occurred at the bow 100, or to detect what state the bow 100 is currently in.

The neural network of the comparison manager 264 can detect or predict an event of the bow 100 based on the sensor data using:

$$A = f_{nn}(\theta_X(t), \theta_Y(t), \theta_Z(t), \alpha_X(t), \alpha_Y(t), \alpha_Z(t))$$

where A is the detected event or state, $f_{nn}$ is a trained neural network model, $\theta_X(t)$, $\theta_Y(t)$, and $\theta_Z(t)$ are time-series angular orientations of the bow 100 about the X, Y, and Z axes, respectively (e.g., the angular orientation data provided as the sensor data from the gyroscopes 214), and $\alpha_X(t)$, $\alpha_Y(t)$, and $\alpha_Z(t)$ are time-series angular accelerations or vibrations of the bow 100 about the X, Y, and Z axes, respectively (e.g., the angular acceleration data provided as the sensor data from the accelerometers 212).

In some embodiments, the neural network of the comparison manager 264 is provided with the comparison manager 264 pre-trained (e.g., trained on a set of training data obtained in a lab or controlled setting). In some embodiments, the neural network of the comparison manager 264 is trained by prompting the user to perform various actions or events in a training mode, while obtaining the sensor data, and using the obtained sensor data as the training set for the neural network. In some embodiments, the neural network of the comparison manager 264 is provided with the comparison manager 264 pre-trained and can be calibrated (e.g., weights of neurons of the neural network thereof adjusted) based on subsequently obtained sensor data of the accelerometers 212 and/or the gyroscopes 214 of the bow 100.

Wireless Communications

Referring still to FIG. 4, the memory 231 includes the wireless manager 244, according to some embodiments. In some embodiments, the wireless manager 244 is configured to obtain any of the analytic data provided by the analytics manager 240, or the display data provided by the interface manager 242. In some embodiments, the wireless manager 244 is configured to transmit the display data as wireless data to the personal computer device 220 for display on the personal computer device 220. The wireless manager 244 can also facilitate wireless communication of any of the data that is received, processed, used, output, determined, calculated, predicted, etc., by the various components of the memory 231, or more generally, of the processing circuitry 228 with any of the remote system 222 and/or the personal computer device 220. In some embodiments, the wireless manager 244 is configured to wirelessly communicate with the user interface 218 via the wireless transceiver 216 in an embodiment where the user interface 218 is wirelessly communicably coupled with the controller 202. In some embodiments, wireless communication between the controller 202, the personal computer device 220, and the remote system 222 is facilitated through connection to a shared network. For example, the personal computer device 220 and the controller 202 can both connect to a same Wi-Fi network and communicate via the Wi-Fi network (e.g., a hotspot Wi-Fi network).

In some embodiments, the remote system 222 is or includes a social media system (e.g., a website). In some embodiments, the wireless manager 244 and/or the personal computer device 220 are configured to publish various data (e.g., analytic data, aim game result data, tournament reports, hunting reports, display data, etc.) to a social media page. In some embodiments, the controller 202 and/or the personal computer device 220 are configured to store login credentials for various social media platforms to facilitate automatic or semi-autonomous publication of data to the social media platforms. In some embodiments, the personal computer device 220 is configured to wirelessly communicate with the controller 202 through a mobile application that, when loaded on the personal computer device 220, configures the personal computer device 220 to facilitate bi-directional wireless communication with the controller 202 to facilitate any of the functionality or interactions described herein. In some embodiments, the personal computer device 220 is configured to communicate with a social media platform if the user of the bow 100 and the personal computer device 220 opts to allow the mobile application login credentials and appropriate permissions for the social media platform.

Modes

Figure 5:
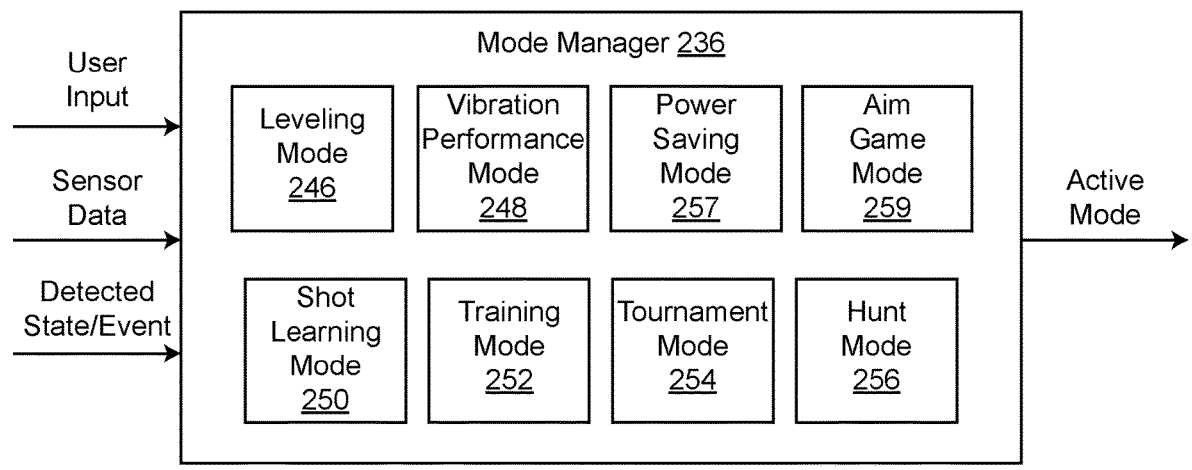
FIG. 5 is a block diagram of a mode manager of the controller of FIG. 4 in greater detail, according to some embodiments.

Referring now to FIG. 5, the mode manager 236 is shown in greater detail, according to some embodiments. The mode manager 236 includes a variety of different modes or tools, that, when activated, configure the analytics manager 240 and the interface manager 242 to operate according to the active mode, according to some embodiments. In some embodiments, the mode manager 236 is configured to provide any of the modes described herein to the interface manager 242 and/or the analytics manager 240 based on the user input, the sensor data, or the detected state or event, or any combination thereof. For example, the mode manager 236 can activate a particular mode in response to a user selection that the particular mode should be activated (e.g., a user selection provided via the user interface 218). In some embodiments, the mode manager 236 is configured to use the detected state or event of the bow 100 as provided by the state/event manager 234 to automatically determine which of the modes should be activated. For example, if the state or event indicates that the string of the bow 100 is being draw, the mode manager 236 can activate an appropriate mode (e.g., shot learning mode 250). It should be understood that the modes described herein are for explanatory purposes only, and while in preferred embodiments, function as separate modes, any of the functionality described herein with reference to each mode or tool can be implemented while another one of the modes or tools is activated.

Bow Leveling Tool

Referring still to FIG. 5, the mode manager 236 includes a leveling mode 246, that, when activated, implements a bow leveling tool to facilitate proper leveling of the bow 100, according to some embodiments. When the leveling mode 246 is activated, the analytics manager 240 and the interface manager 242 can track a real-time orientation of the bow 100 and provide a visual indication to the user of the bow 100 indicating a current orientation of the bow 100 about any of the X-axis, the Y-axis, or the Z-axis. For example, the analytics manager 240 and the interface manager 242 may obtain a first angular orientation $\theta_x$ of the bow 100 about the X-axis, a second angular orientation $\theta_y$ of the bow 100 about the Y-axis, and a third angular orientation $\theta_z$ about the Z-axis. In some embodiments, the first angular orientation $\theta_x$, the second angular orientation $\theta_y$, and the third angular orientation $\theta_z$ are obtained from the gyroscopes 214. In some embodiments, the analytics manager 240 is configured to store and use one or more "level" orientation values, referred herein as $\theta_{x0}$, $\theta_{y0}$, and $\theta_{z0}$. For example, the analytics manager 240 may be configured to observe the first angular orientation $\theta_x$, the second angular orientation $\theta_y$, and the third angular orientation $\theta_z$, and compare the first, second, and third angular orientations $\theta_x$, $\theta_y$, and $\theta_z$ to the corresponding first level angular orientation $\theta_{x0}$, the second level angular orientation $\theta_{y0}$, and the third level angular orientation $\theta_{z0}$.

If the first angular orientation $\theta_x$ is substantially equal to the first level orientation value $\theta_{x0}$, then the analytics manager 240 can determine that the bow 100 is level with respect to the X-axis, according to some embodiments. If the bow 100 is level with respect to the X-axis, the interface manager 242 can operate the user interface 218 to provide a visual indication to the user via the display screen 224, according to some embodiments. If the bow 100 is not level with respect to the X-axis (e.g., the first angular orientation $\theta_x$ is not substantially equal to the level orientation value $\theta_{x0}$), then the interface manager 242 operates the display screen 224 to provide a visual indication to the user that the bow 100 is not level. The visual indication of whether the bow 100 is leveled can be provided in real-time via the display screen 224 to facilitate leveling of the bow 100, according to some embodiments. For example, the user can adjust the angular orientation of the bow 100 until the visual indication shows that the bow 100 is level. In some embodiments, the user interface 218 is configured to provide different colors to indicate whether or not the bow 100 is leveled about the X-axis. In some embodiments, a value of a difference between the first orientation value $\theta_x$ and the first level orientation value $\theta_{x0}$ is provided to the user via the display screen 224 to notify the user regarding a required rotation amount that the bow 100 should be rotated to achieve a level orientation about the X-axis (e.g., so that the first orientation value $\theta_x$ is substantially equal to the first level orientation value $\theta_{x0}$).

In some embodiments, the interface manager 242 and the analytics manager 240 are configured to use a range of values of angular orientation to determine if the bow 100 is sufficiently leveled. For example, the analytics manager 240 can compare the first angular orientation $\theta_x$ to a minimum angular orientation $\theta_{x,min}$ and a maximum angular orientation $\theta_{x,max}$. If the first angular orientation $\theta_x$ is within a range defined between the minimum angular orientation $\theta_{x,min}$ and the maximum angular orientation $\theta_{x,max}$, then the interface manager 242 operates the display screen 224 to provide a visual indication (e.g., a green color) that the bow 100 is leveled. In some embodiments, the minimum angular orientation $\theta_{x,min}$ and the maximum angular orientation $\theta_{x,max}$ are predetermined angular values. For example, if the first level orientation value $\theta_{x0}$ is 0 degrees, then the minimum angular orientation $\theta_{x,min}$ may be −0.5 degrees, and the maximum angular orientation $\theta_{x,max}$ may be +0.5 degrees, so that the bow 100 is considered level when the first angular orientation $\theta_x$ is 0 degrees+/−0.5 degrees (and thereby the display screen 224 is operated to indicate if the bow 100 is level or not about the X-axis). It should be understood that the specific values of the first level orientation $\theta_{x0}$, the minimum angular orientation $\theta_{x,min}$ and the maximum angular orientation $\theta_{x,max}$ as described herein are illustrative only, and may be any other values. In some embodiments, the minimum angular orientation $\theta_{x,min}$ and the maximum angular orientation $\theta_{x,max}$ are percentages, standard deviations, portions of a standard deviation, etc., or any other range of values that are considered acceptable or "level."

It should be understood that while the description herein of leveling the bow 100 is described with reference to the first angular orientation $\theta_x$ the leveling of the angular orientation of the second angular orientation $\theta_y$ and the third angular orientation $\theta_z$ may also be performed similarly to achieve leveling of the bow 100 about the X-axis, the Y-axis, and the Z-axis. In some embodiments, the display screen 224 is operated by the interface manager 242 to provide a visual indication regarding whether or not the bow 100 is leveled with respect to the X-axis, the Y-axis, or the Z-axis. In some embodiments, the display screen 224 is configured to provide a field for each of the first angular orientation $\theta_x$, the second angular orientation $\theta_y$, and the third angular orientation $\theta_z$ indicating a current angular value and an offset of the angular orientations relative to a desired or a level value (e.g., the first level angular orientation $\theta_{x0}$, the second level angular orientation $\theta_{y0}$, and the third level angular orientation $\theta_{z0}$).

Advantageously, the leveling tool can facilitate proper leveling of the bow 100 (e.g., in a vice) for maintenance. The user may monitor the display screen 224 while adjusting the angular orientation of the bow 100 about any of the X-axis, the Y-axis, or the Z-axis, until the bow 100 is leveled. Advantageously, the gyroscopes 214 monitor an angular orientation of the bow 100 about different axes, while the display screen 224 operates to provide a digital display of a current angular orientation of the bow 100, and additionally an indication of whether or not the current angular orientation of the bow 100 is sufficiently level (e.g., providing a green color when the current angular orientation of the bow 100 is within +/−0.5 degrees of level, and a red or yellow color when the current angular orientation of the bow 100 is not within +/−0.5 degrees of level).

In some embodiments, the level angular orientation values (e.g., $\theta_{x0}$, $\theta_{y0}$, and $\theta_{z0}$) are predetermined values (e.g., each being equal to 0). In some embodiments, the level angular orientation values can be adjusted or calibrated to account for any inaccuracy in the gyroscopes 214. In some embodiments, the leveling mode 246 can include a calibration sub-mode, into which the analytics manager 240 and/or the interface manager 242 are transitioned in response to a user input via the user interface 218. For example, the user may operate the user interface 218 by pressing various buttons of the input devices 226, or by providing a user input via the personal computer device 220 to transition the controller 202 into the calibration sub-mode. When the controller 202 is in the calibration sub-mode, the interface manager 242 may prompt the user to level the bow 100 about the X-axis via operation of the display screen 224 (e.g., a notification). Once the user has leveled the bow 100 about the X-axis, the user may provide a user input indicating that the bow 100 is leveled about the X-axis, and the analytics manager 240 can record the first angular orientation $\theta_x$ as the first level angular orientation $\theta_{x0}$. In this way, the currently read first angular orientation $\theta_x$, obtained as the sensor data from the gyroscopes 214 can be set as the first level angular orientation $\theta_{x0}$. This process can be repeated for each of the second angular orientation $\theta_y$ and the third angular orientation $\theta_z$ to calibrate the level angular orientation values $\theta_{x0}$, $\theta_{y0}$, and $\theta_{z0}$. In some embodiments, the user may level the bow 100 using a fixture and a precise leveling tool, then provide the controller 202 with a user input that the currently detected angular orientation values of the bow 100, as detected by the gyroscopes 214, should be set as the "level" or "zeroed" angular orientation values $\theta_{x0}$, $\theta_{y0}$, and $\theta_{z0}$.

Shot Learning Mode

Referring still to FIG. 5, the mode manager 236 includes a shot learning mode 250, according to some embodiments. In some embodiments, the shot learning mode 250, when activated, configures the analytics manager 240 and the interface manager 242 to collect data (e.g., automatically, semi-automatically, etc.) indicative of an accurate shot. For example, when the shot learning mode 250 is activated, the interface manager 242 can prompt the user to take one or more shots, and once the shot(s) are completed, provide an input indicating shot quality. The shot quality may be provided as an input via the user interface 218 (e.g., using the input device(s) 226) or may be provided as an input via the personal computer device 220 through wireless communications with the controller 202, or the remote system 222. In some embodiments, the shot quality is a quantifiable quality of the shot taken. For example, the shot quality may be a discrete value such as "Good" or "Bad," "Accurate" or "Inaccurate," etc., or may be a rating between a variety of levels (e.g., a score, such as 1-5, 1-10, etc.). In this way, the controller 202 can collect sensor data (e.g., time-series angular orientation, time-series angular acceleration, etc.) associated with "good" or "bad" shots.

Figure 6:
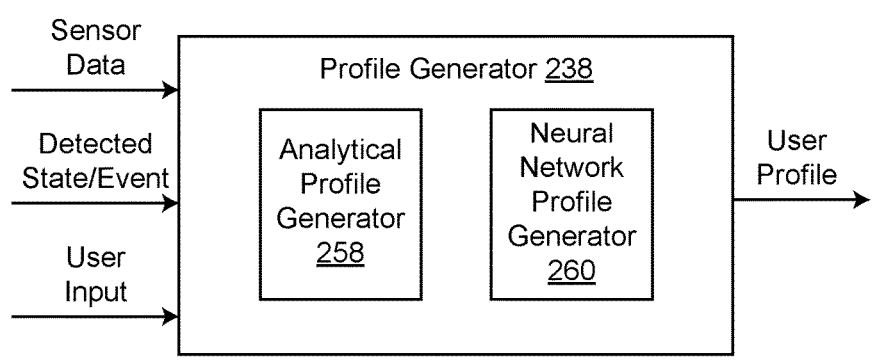
FIG. 6 is a block diagram of a profile generator of the controller of FIG. 4 in greater detail, according to some embodiments.

Referring particularly to FIG. 6, the profile generator 238 can be configured to use the sensor data obtained from the accelerometers 212 and the gyroscopes 214 when the user performs a "good" or "bad" shot with the bow 100 to determine one or more characteristics, parameters, properties, etc., of the sensor data that are associated with a "good" shot and that are associated with a "bad" shot, according to some embodiments. In some embodiments, the profile generator 238 is configured to also use a detected state or event as provided by the state/event manager 234. For example, the detected state/event may be a "shot fired" event and a corresponding timestamp at which the string was released by the user to fire the shot.

The profile generator 238 can analyze the sensor data from a time period preceding the "shot fired" or can analyze sensor data immediately preceding the time at which the "shot fired" event occurs to identify one or more characteristics of the sensor data that are correlated with the "good" shot or the "bad" shot, according to some embodiments. In some embodiments, the profile generator 238 is configured to use an analytic technique, shown as analytical profile generator 258, or a neural network technique, shown as neural network profile generator 260 to identify different characteristics of the sensor data that are associated with the "good" shot or the "bad" shot.

For example, the profile generator 238 may determine, based on the sensor data, that the user generally performs a "good" shot when vibrations or angular accelerations of the bow 100 immediately preceding release of the string are below a certain level. Similarly, the profile generator 238 may identify, based on the sensor data, that the user is more likely to perform a "bad" shot when vibrations or angular accelerations of the bow 100 immediately preceding release of the string are above a certain level. In some embodiments, the profile generator 238 may also use the shot quality and the detected state/event data to determine an amount of aiming time that is typically associated with the "good" or "bad" shot (e.g., an amount of time between a drawing of the string event, and a release of the string event or a shot event). In some embodiments, the characteristics can include an average angular position of the bow 100 about the X, Y, or Z axes, or any combination thereof. For example, the profile generator 238 can identify that the user typically performs a "good" shot when the bow 100 is angled a slight amount about the X axis, and a "bad" shot when the bow 100 is significantly angled about the X axis. In this way, the profile generator 238 can identify user-specific characteristics of the sensor data that are associated with "good" and "bad" shots for the specific user of the bow 100. In some embodiments, the profile generator 238 is configured to identify characteristics, variables, or parameters of the sensor data that predict whether the shot will be "good" or "bad" (i.e., predictor variables) in addition to values, ranges, thresholds, etc., for any of the predictor variables that determine if the shot is "good" or "bad." In this way, the profile generator 238 may learn to differentiate between parameters of the sensor data that do not predict if the shot will be "good" or "bad" and predictor variables that are often a valuable predictor of whether or not the shot will be accurate. In some embodiments, the profile generator 238 is configured to build a shot profile that includes specific characteristics, and values, ranges, thresholds, etc., thereof that are associated with a "good" shot. The shot profile can be subsequently used to predict if sensor data obtained from a newly taken shot is "good" or "bad" and to provide the user feedback (e.g., via the user interface 218 or the personal computer device 220) regarding deviations of one or more of the characteristics of the newly taken shot from the "good shot" characteristics shot profile to inform the user regarding potential improvements or adjustments that the user can perform when aiming and firing the bow to improve the user's accuracy.

It should be understood that the profile generator 238 may use the analytical profile generator 258 or the neural network profile generator 260 to generate the shot or user profile as described herein. The neural network profile generator 260 and/or the analytical profile generator 258 as used by the profile generator 238 may be similar to the analytical or neural network techniques described in greater detail above with reference to the state/event manager 234.

Once the user profile has been generated, the user profile can be provided to the analytics manager 240 for use in predicting if a newly taken shot will be a "good" shot or a "bad" shot and also to identify differences between characteristics or parameters of the shot profile and characteristics or parameters of the newly taken shot to provide feedback to the user regarding potential improvements in form to facilitate increasing a likelihood of the user performing a "good" shot.

Training Mode

Referring particularly to FIG. 5, the mode manager 236 includes a training mode 252, according to some embodiments. In some embodiments, when the training mode is activated (e.g., in response to a user input provided via the user interface 218 or via the personal computer device 220), the analytics manager 240 is configured to use the user profile provided by the profile generator 238 (e.g., the shot profile), obtain real-time or new sensor data from the accelerometers 212 and/or the gyroscopes 214, and perform an analysis or comparison between the shot profile and the new sensor data to determine one or more recommendations and/or display data for the user. In some embodiments, the analytics manager 240 is also configured to obtain a detected state or event (e.g., a shot event) provided by the state/event manager 234, and a timestamp at which the event occurs for use in the analysis or comparison.

In some embodiments, the analytics manager 240 is configured to use the shot profile and one or more characteristics or parameters of the shot profile that indicate a "good" shot to determine if the new sensor data obtained from taking a new shot indicate that the new shot is a "good" or "bad" shot. For example, the characteristics or parameters may be provided as values with a calculated amount of uncertainty or variance as $C_n +/- C_{\Delta,n}$ where $C_n$ is the value of an nth characteristic or parameter for a good shot, and $C_{\Delta,n}$ is an uncertainty, deviation, or variance associated with the nth characteristic or parameter.

In some embodiments, the analytics manager 240 is configured to use the sensor data obtained from the accelerometers 212 and/or the gyroscopes 214 to determine n characteristics or parameters of the newly taken shot, $C_{n,shot}$. In some embodiments, the analytics manager 240 is configured to compare each of the n characteristics or parameters, $C_{n,shot}$ to each of the corresponding characteristics or parameters of the shot profile. If a jth newly obtained characteristic or parameter $C_{j,shot}$ is substantially equal to a corresponding jth characteristic parameters of the shot profile (e.g., $(C_j - C_{\Delta,j}) \leq C_{j,shot} \leq (C_j + C_{\Delta,j})$), then the analytics manager 240 may determine that the jth newly obtained characteristic or parameter of the new shot is qualified as matching ideal or optimal characteristic values, and operate the interface manager 242 to provide any of the value of the jth newly obtained characteristic or parameter, and an indication that the j the newly obtained characteristic or parameter is "optimal" or "ideal", thereby providing positive reinforcement to the user. In some embodiments, analytics manager 240 and interface manager 242 are configured to perform similar functionality for each of the n newly obtained characteristics or parameters of the newly taken shot. In the case when a kth newly obtained characteristic or parameter $C_{k,shot}$ is not substantially equal to the corresponding kth characteristic or parameter of the shot profile (e.g., $(C_k + C_{\Delta,k}) \leq C_{k,shot}$ or $C_{k,shot} \leq (C_j - C_{\Delta,k})$), the analytics manager 240 may identify the kth parameter as deviating from the ideal or optimal value, and can prompt the interface manager 242 to operate the user interface 218 (e.g., the display screen 224 of the user interface 218) to operate to indicate to the user that the kth characteristic or parameter of the newly taken shot is sub-optimal. In some embodiments, the analytics manager 240 is also configured to estimate a deviation between the kth newly obtained characteristic or parameter and the ideal or optimal value of the kth characteristic or parameter as provided by the shot profile. For example, the analytics manager 240 can estimate a difference $\Delta C_k = C_{k,shot} - C_k$ or $\Delta C_k = C_k - C_{k,shot}$ to determine a magnitude of deviation of the kth newly obtained characteristic or parameter relative to the ideal or optimal value of the kth characteristic. In some embodiments, the analytics manager 240 is configured to provide the difference $\Delta C_k$ to the interface manager 242 as a display command so that the interface manager 242 operates the user interface 218 to display the difference $\Delta C_k$. In this way, the user interface 218 (e.g., the display screen 224 or the personal computer device 220) can provide an indication, recommendation, suggestion, etc., to the user to improve their archery skills, with a quantifiable change that the user should implement to improve their archery skills.

For example, if the kth parameter or characteristic is a bow float prior to releasing the string for the new shot, and the amount of float exceeds the ideal or optimal float amount, the analytics manager 240 and the interface manager 242 can operate the user interface 218 to notify the user that an excessive amount of float was detected when implementing the new shot, and that the user should attempt to steady their arm when taking subsequent shots to improve shot accuracy. Similarly, if the kth parameter or characteristic is a specific angular orientation of the bow 100 about one of the X, Y, or Z axes, and the value of the newly obtained kth parameter deviates from the ideal or optimal value of the kth parameter or characteristic, the analytics manager 240 and the interface manager 242 can cooperatively operate the user interface 218 to notify the user that, to improve the users shot, the user should adjust orientation of the bow 100 a specific amount about a particular axis. Advantageously, the training mode 252 facilitates improved archery skills in a user-specific manner (e.g., using the shot profile that is generated by the profile generator 238 based on user-specific training data). It should be understood that any of the characteristics or parameters described herein are not necessarily limited to single values, and may be or include time-series data that can predict shot accuracy or inaccuracy.

In some embodiments, the analytics manager 240 is also configured to use one or more pre-defined profiles that are not generated based on user-specific data. For example, the analytics manager 240, the profile generator 238, etc., may include one or more pre-loaded or predefined profiles for "good" shots or "bad" shots. For example, the pre-loaded or predefined profiles can be profiles that are generated based on training data obtained from an expert marksman, and the training mode 252 can use shot profiles from one or more expert marksmen to provide recommendations to the user of the bow 100 to adjust their form or technique to learn the expert marksmen's style of shooting. In some embodiments, the shot profile that is used by the analytics manager 240 when in the training mode 252 can be selected by the user by providing a user selection via the user interface 218, the personal computer device 220, etc. In this way, the user can select their own shot profile to improve their technique relative to their optimal techniques, or can select a different shooter's profile (e.g., an expert marksman) to learn the different shooter's technique.

In some embodiments, if the training mode 252 is activated by the user before a user or shot profile has been established, generated, or populated by the profile generator 238, the analytics manager 240 can operate according to the training mode 252 based on one of the preloaded or predefined profiles. In some embodiments, if the training mode 252 is activated by the user before a user or shot profile has been generated by the profile generator 238, the analytics manager 240 and the interface manager 242 can operate to provide (e.g., via the user interface 218 and/or the personal computer device 220) feedback to the user regarding specific characteristics (e.g., aiming time, bow float, shot angle, etc.) or information regarding shots taken in real-time.

It should be understood that any of the parameters or characteristics, number of shots, shot data, sensor data, estimated deviations of characteristics or parameters of subsequently taken shots relative to the characteristics or parameters of the shot profile, etc., can be stored in the memory 231 of the controller 202, uploaded to the remote system 222, etc., for use in analytics, progress tracking, report generation, etc. In some embodiments, the analytics, progress tracking, reports (e.g., weekly reports, etc.), can be retrieved or accessed by the user via the user interface 218, the personal computer device 220, the remote system 222 (e.g., via a website).

In some embodiments, the interface manager 242 and the analytics manager 240 are configured to track the various parameters or characteristics in real-time, and when the parameters or characteristics are near or at the ideal or optimal values, notify the user to fire the bow 100. For example, the analytics manager 240 can track aiming float or aiming time in real-time once the user draws the bowstring, and once the aiming float is optimal and the aiming time is optimal, send a display command to the interface manager 242 to notify the user to fire the bow 100. In some embodiments, the interface manager 242 is configured to operate the display screen 225 (e.g., by flashing a color, changing a color, etc.) to provide the notification to the user to fire the bow 100. In some embodiments, the interface manager 242 is configured to operate a vibration device of the sensor and processing system 200 so that the bow 100 vibrates slightly, thereby notifying the user that optimal conditions for releasing the bowstring and firing the arrow have been reached.

Tournament Mode

Referring still to FIG. 5, the mode manager 236 includes a tournament mode 254, according to some embodiments. In some embodiments, when the tournament mode 254 is activated, the analytics manager 240 can be configured to perform similar analyses as when the training mode 252 is activated, but the interface manager 242 does not operate the same (e.g., providing real-time feedback, suggestions, etc., to the user to improve their shot accuracy). In some embodiments, the tournament mode 254 can be activated to collect and store different sensor data for shots taken by the user during a tournament. In some embodiments, the analytics manager 240 is configured to collect, estimate, obtain, or calculate the various characteristics or parameters described herein based on the sensor data of each of the shots taken during the tournament (e.g., while the tournament mode 254 is activated), estimate deviations of the various characteristics of parameters relative to the ideal or optimal values of the characteristics or parameters as provided by the user or shot profile, and store the estimations, calculated characteristics or parameters, sensor data, etc., of each shot event and/or the time period preceding the shot event for later viewing and access by the user (e.g., after the tournament is completed, or after the tournament mode 254 is deactivated).

In some embodiments, the analytics manager 240 is configured to perform any of the functionality described in greater detail below with reference to FIG. 8 based on any of the data obtained when the tournament mode 254 is active. In some embodiments, the analytics manager 240 may generate reports for the tournament (e.g., for the time period that the tournament mode 254 is active), which can be later accessed by the user. In some embodiments, the analytics manager 240, when the tournament mode 254 is active, performs all of the functionality as when the training mode 252 is active, but withholds display commands, and instead stores the data as historical data in a database, as well as any reports, for later viewing by the user. In this way, the notifications provided to the user by the interface manager 242 when the training mode 252 is activated can be delayed until after the tournament. Further, the notifications can be provided as a report instead of in real-time as when the training mode 252 is active.

Hunting Mode

Referring particularly to FIG. 5, the mode manager 236 includes a hunting mode 256, according to some embodiments. In some embodiments, when the hunting mode 256 is activated (e.g., via a user input, based on sensor data, based on detected conditions or states of the bow 100, etc.), the analytics manager 240 can be configured to perform similar functionality as when the tournament mode 254 or the training mode 252 are activated, except for a certain number of shots that are taken at random times over a hunting time period. For example, the analytics manager 240 may obtain and record sensor data, parameters, characteristics, times, etc., of a shot event for one to six different shots, and store them for later viewing (e.g., in a report) by the user, similar to the tournament mode 254. In some embodiments, when in the hunting mode 256, the sensor and processing system 200 automatically transitions into a low power mode (e.g., power saving mode 257 as described in greater detail below) to conserve energy consumption from the power source 208. In some embodiments, the low power mode may be a sub-mode that is activated during any of the modes of the mode manager 236 to conserve power. In some embodiments, the sensor and processing system 200 automatically translates out of the low power mode to a normal operating mode in response to sensor data or in response to a detected state/event. For example, the sensor and processing system 200 can automatically transition out of the low power mode when the state/event manager 234 indicates that the bowstring has been drawn (e.g., indicating that a shot will likely be taken in the near future). The low power mode may advantageously be implemented as a sub-mode of the hunting mode 256, since when the bow 100 is used for hunting, the bow 100 may be in an idle state for a majority of a hunting trip, and only needs to transition out of the low power mode when the user is about to take a shot (e.g., at game).

In some embodiments, the analytics manager 240 is configured to use sensor inputs or GPS location and/or global orientation provided by the GPS 203 during the hunting mode 256. As discussed above, the GPS 203 can be a component of the sensor and processing system 200 or can be a remote component or device (e.g., a component of the personal computer device 220, a component of the remote system 222, etc.). For embodiments in which the GPS 203 is not a component of the sensor and processing system 200 onboard the bow 100, the controller 202 may receive the GPS location and/or global orientation provided by the GPS 203 as an input (e.g., via the transceiver 216). For example, the analytics manager 240 may communicate with an application installed on the personal computer device 220 to obtain the GPS location and/or global orientation provided by the GPS 203 when operating in the hunting mode 256. In some embodiments, the analytics manager 240 is configured to use the global orientation to determine a direction or a relative distance of a target between the bow 100 and a target. In some embodiments, the interface manager 242 is configured to operate the display screen 224 to provide a general direction and/or distance that the arrow is estimated to have flown to thereby guide the user to the target.

In some embodiments, the analytics manager 240 is configured to obtain a GPS location from the GPS 203 when a shot is taken (e.g., when the state/event manager 234 detect a shot event). In some embodiments, the GPS location can be stored in a database (e.g., database 266) for use in generating a hunting report, or a hunting map. The hunting map can be a visualization that indicates different locations from during the user's hunting trip that shots were taken, according to some embodiments. In some embodiments, the hunting map may indicate a visualization of areas that are opportune hunting locations. For example, clusters of markers on the hunting map can indicate multiple shots were taken at a particular location, which can be used by the user to identify and track areas where a significant amount of game was found, according to some embodiments. Advantageously, the hunting map can be stored (e.g., in memory of the controller 202, in a remote server, database, etc.) and accessed by the user for planning future hunting trips, or so that the user can return to the location or general vicinity where a significant amount of game was viewed. In some embodiments, the user can provide an input to the controller 202 (e.g., via the input devices 226 of the user interface 218 or via the personal computer device 220) when game is found at a particular location. In some embodiments, in response to such an input, the analytics manager 240 retrieves a current location from the GPS 203 and saves that location in a database as a marker. For example, if the user does not have appropriate tags for a particular type of game, but views game, the user can thereby save the GPS location where the game was seen, for use in learning different vicinities that game was seen, even if a shot is not taken.

In some embodiments, the analytics manager 240 can also use GPS location data to identify an elevation of each of the shots taken when the hunting mode 256 is active. For example, the elevation data can also be stored and used to determine the user's performance for elevated shots. In some embodiments, the interface manager 242 is also configured to provide the user with an indication regarding daily shot quantity goals (e.g., via the user interface 218 and/or the personal computer device 220). The analytics manager 240 can track a number of shots performed each day based on the outputs of the state/event manager 234, and the interface manager 242 can operate the display screen 224 or the personal computer device 220 to display a number of actual shots taken daily versus the shot quantity goals. In some embodiments, the GPS location data is recorded for a certain amount of time by the analytics manager 240 after a shot is performed to facilitate tracking an animal.

In some embodiments, the hunting mode 256 also includes a hunting training sub-mode. It should be understood that the hunting training sub-mode as described herein may also be functionality of the bow 100 when the training mode 252 is enabled. In some embodiments, the analytics manager 240 and the interface manager 242 are configured to prompt the user to shoot or practice according to different situations, distances, etc. For example, the user may be prompted to shoot at a target that is 20 feet away at an elevated position. The controller 202 can operate when the user performs these practice situations to obtain performance data (e.g., to obtain sensor data and determine the user's archery performance using the techniques described herein). In some embodiments, the hunting training sub-mode also prompts the user periodically prior to a hunting trip to perform various check-ups or setup procedures to ensure proper functioning of the bow 100.

Vibration Performance Tool

Referring particularly to FIG. 5, the mode manager 236 includes a vibration performance mode 248, according to some embodiments. In some embodiments, when the vibration performance mode 248 is activated, the analytics manager 240 and the interface manager 242 are configured to obtain or calculate vibration data of the bow 100 based on the sensor data obtained from the accelerometers 212 and/or the gyroscopes 214 and operate the user interface 218 or the personal computer device 220 to provide a visual indication of an estimated amount of vibration of the bow 100 to the user. In some embodiments, for example, a user may desire to know if installation of one or more accessories on the bow 100 advantageously damped vibrations of the bow 100 or are detrimental in terms of vibrations in the bow 100 during a shot event. The user may install an accessory on the bow 100, fire the bow, and view a report provided on the user interface 218 or the display screen 224 thereof by the interface manager 242 and the analytics manager 240 that illustrates vibration analytics of the bow 100 with the newly installed accessory. In this way, the vibration performance mode 248 facilitates providing the user with information regarding whether or not the newly installed accessory aids or is detrimental to vibration characteristics of the bow 100, and thereby if the newly installed accessory has adverse effects on shot accuracy or not. In some embodiments, the report provided via the user interface 218 or the display screen 24 thereof includes amounts of vibration or acceleration about a variety of axes, a graph of accelerations or vibrations of the bow 100 over time (e.g., including the shot event), etc.

Power Saving Mode

Referring still to FIG. 5, the mode manager 236 includes a power saving mode 257, according to some embodiments. In some embodiments, the power saving mode 257 is automatically activated as a sub-mode for any of the modes of the mode manager 236. For example, when the bow 100 is not moved or is relatively stationary for a certain amount of time, this may indicate that the sensor and processing system 200 can be transitioned into the power saving mode 257 (e.g., the "low power mode"). In some embodiments, the sensor and processing system 200 can be automatically transitioned out of the power saving mode 257 in response to motion of the bow 100 as indicated by the sensor data, and/or in response to the user drawing the bowstring to take a shot (e.g., as indicated by the sensor data and/or by a bowstring sensor).

When the power saving mode 257 is active (e.g., as a sub-mode of any of the other modes described herein), the sensor and processing system 200 may have reduced functionality, or some features may be deactivated. For example, instead of polling each of the accelerometers 212 and gyroscopes 214, only one of the accelerometers 212 and/or gyroscopes 214 may be polled by the controller 202 for detection of motion at the bow 100 or for detection of drawing of the bowstring, or any other event that may indicate that the sensor and processing system 200 should transition out of the power saving mode 257. The power saving mode 257 can also include de-activating the GPS 203, de-activating or reducing brightness of the display screen 224, de-activating or delaying transmissions via the wireless transceiver 216, reducing a polling frequency of the accelerometers 212 and/or the gyroscopes 214, adjusting the power regulator 210, etc.

Aim Game Mode

Referring still to FIG. 5, the mode manager 236 includes an aim game mode 259, according to some embodiments. In some embodiments, the aim game mode 259 is similar to the training mode 252 as described in greater detail above. The aim game mode 259 may additionally present the display data in a gamified manner on the display screen 224 or on the personal computer device 220. In some embodiments, for example, the interface manager 242 is configured to provide a score to the user via the display screen 224 or via the personal computer device 220. In some embodiments, the score is a performance indicator of the user's shooting over a time period or for a certain number of shots. For example, the performance indicator may be based on an average float of the bow 100 during multiple different shots taken when the aim game mode 259 is active. After an aiming game is completed by the user (e.g., shoot a number of shots, attempt to hold the bow 100 as steady as possible when shooting, etc.), the user may be presented with their score or performance indicator. The scores or performance indicators that are generated each time the game is played in the aim game mode 259 can be stored and presented to the user subsequently with textual information (e.g., "Try to beat your previous score!"). Advantageously, the aim game mode 259 can be performed to facilitate improving archery skills in a gamified manner, and improvements may be tracked and displayed to the user over time using any of the data display, report generation, etc., techniques described throughout the present application.

Analytics Manager

Figure 8:
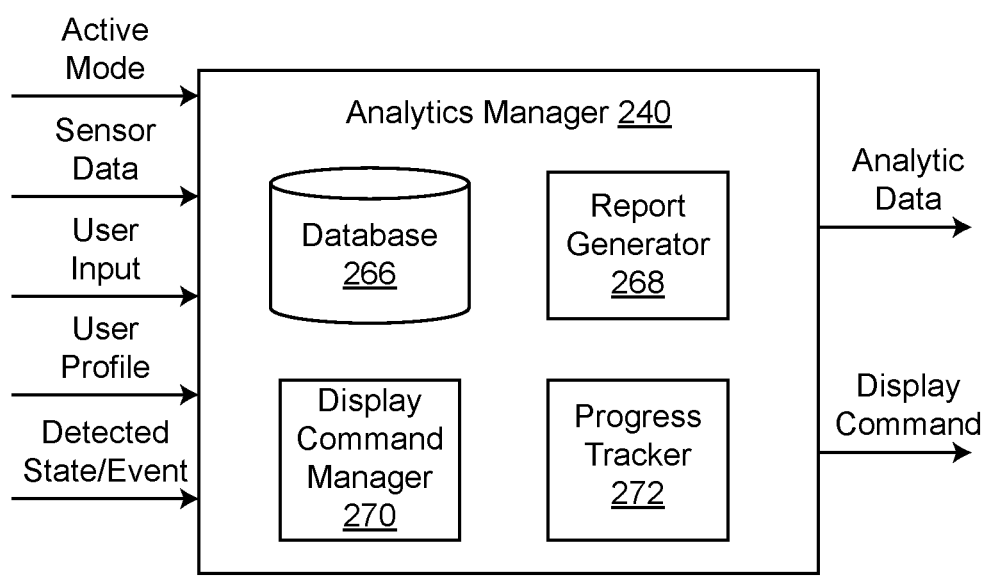
FIG. 8 is a block diagram of an analytics manager of the controller of FIG. 4 in greater detail, according to some embodiments.

Referring particularly to FIG. 8, the analytics manager 240 includes a database 266, a report generator 268, a progress tracker 272, and a display command manager 270, according to some embodiments. In some embodiments, the analytics manager 240 is configured to store data in the database 266. The data that is stored in the database 266 can be or include sensor data obtained when the user takes one or more shots, a counter number of shots taken over a time interval (e.g., a hunting time period, a training time period, a tournament time period, etc.), a counter number of dryfire shots taken over a lifetime of the bow 100, a counter number of shots taken over the lifetime of the bow 100, the user or shot profile, training data used to generate the user or shot profile, GPS data, time-series angular acceleration and/or orientation data, detected time-series state or event data, etc.

Referring still to FIG. 8, the progress tracker 272 can be configured to monitor performance data of the user over time, and generate progress data based on the performance data for use by the report generator 268 in generating a report, according to some embodiments. In some embodiments, the performance data is one or more of the characteristics or parameters of shots performed at the bow 100 relative to the characteristics of parameters of the user or shot profile. For example, the progress tracker 272 can average float of the bow 100 when the bow 100 is aimed (e.g., during an aiming state, after an event that indicates the string has been drawn at the bow 100 but before a shot event has occurred) over a time period (e.g., a weekly time period, a monthly time period, a daily time period, etc.), and use the averaged value relative to the optimal or ideal values of the float parameter as provided by the shot profile to determine an average deviation of the float relative to the ideal or optimal float. The progress tracker 272 can similarly analyze any other shot characteristics or parameters such as aiming time, orientation, etc. In some embodiments, the averaged characteristics or parameters of all the shots taken over the time period (e.g., the weekly time period) are used to determine a progress value that can be plotted as a graph over time, thereby showing the user's improvement over time. In some embodiments, the average deviation of any of the characteristics or parameters can also be averaged over the time period and plotted as a data point to show user improvement.

In some embodiments, certain data that is generated by the report generator 268 or the progress tracker 272 or that is stored in the database 266 is tagged as display data, or hidden data. In some embodiments, the display command manager 270 is configured to generate a display command that is provided to the interface manager 242 based on the tag of the data and/or a user input (e.g., a user request to view a particular dataset, view a report, etc.). In some embodiments, the display command manager 270 only provides a display command for the hidden data if the user provides proper credentials and access level (e.g., a login and password via the personal computer device 220, an administrator login credentials, etc.). In some embodiments, the hidden data is stored in the database 266 of the analytics manager 240 for warranty purposes.

In some embodiments, the report generator 268 is configured to use any of the progress data or progress values, the sensor data, the active mode, the user input, the user profile, or the detected state/event to generate a report (e.g., provided as analytic data to the interface manager 242 and/or the wireless manager 244 for transmission to the remote system 222 and/or the personal computer device 220). In some embodiments, the report generator 268 is configured to generate a report for presentation to the user. The report can include historical data of operation of the bow 100 such as time-series data, graphs, charts, etc., illustrating a number of shots taken, times at which the shots were taken, events or state detection, the user or shot profile, most frequently used modes, power consumption, progress data or values, etc. In some embodiments, the report is provided as analytic data to the interface manager 242 along with the display command, indicating which of the analytic data should be displayed by the interface manager 242. In some embodiments, the analytics manager 240 is configured to provide the analytic data to the wireless manager 244 for transmission via the wireless transceiver 216 to the remote system 222 (e.g., a cloud computing system, a remote database, etc.), and/or the personal computer device 220.

Processes

Shot Counting

Figure 9:
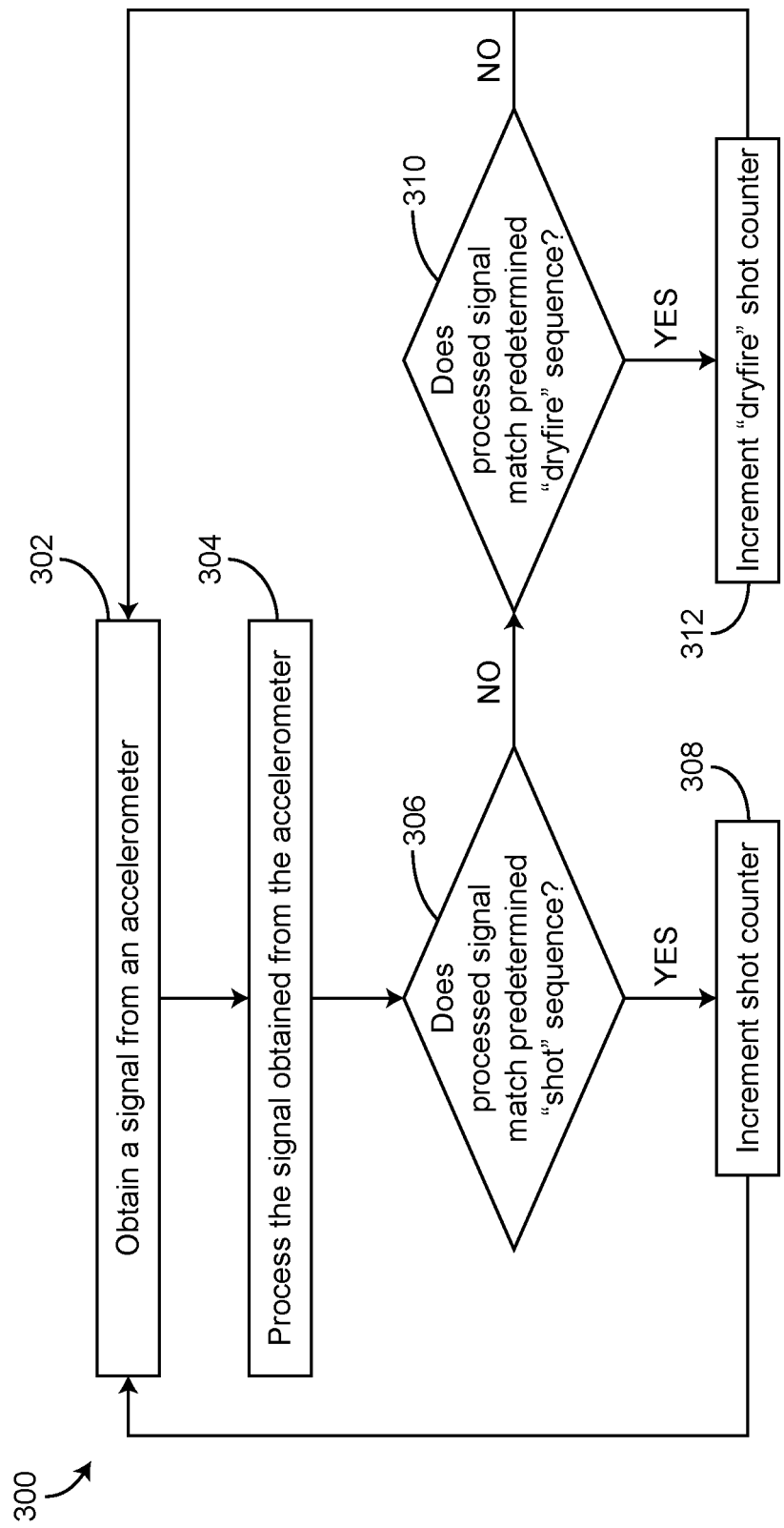
FIG. 9 is a flow diagram of a process for automatically detecting a shot operation and incrementing a shot counter, according to some embodiments.

Referring particularly to FIG. 9, a process 300 for counting a number of shots or dryfire shots performed on a bow is shown, according to some embodiments. In some embodiments, the process 300 includes steps 302-312 and is performed by the sensor and processing system 200 as described in greater detail above with reference to FIGS. 2-8. In some embodiments, process 300 is performed to generate shot counts that can be displayed to the user, and also a dryfire shot count that can be used by a manufacturer for warranty purposes.

Process 300 includes obtaining a signal from an accelerometer (step 302), according to some embodiments. In some embodiments, the accelerometer is a three-axis accelerometer that is physically coupled with the bow and is configured to measure angular acceleration about multiple axes. In some embodiments, the signal obtained from the accelerometer is obtained as time-series data from the accelerometers 212. In some embodiments, the signal obtained is the sensor data as described in greater detail above with reference to FIGS. 2-8. In some embodiments, step 302 is performed by the controller 202. In some embodiments, the signal obtained from the accelerometer is a voltage value (e.g., from 0 to 12 volts) that can be converted to an acceleration value using a predetermined relationship.

Process 300 includes processing the signal obtained from the accelerometer (step 304), according to some embodiments. Step 304 can include converting the voltage values obtained from the accelerometer (e.g., the signal) to values of acceleration. In some embodiments, step 304 is performed by the controller 202 of the sensor and processing system 200 and is performed by converting the voltage values of the signal (e.g., a voltage signal) to acceleration values using the predetermined relationship.

Process 300 includes determining if the processed signal matches a predetermined shot sequence (step 306), according to some embodiments. In some embodiments, the predetermined shot sequence is a signal or a processed signal (e.g., time-series acceleration values) representative of the processed signal when a shot is performed. In some embodiments, step 306 includes performing a statistical analysis, an analytical comparison technique, a neural network comparison technique, etc., to determine if the processed signal matches or resembles the predetermined shot sequence. If the processed signal matches the predetermined shot sequence (step 306, "YES"), process 300 proceeds to step 308, according to some embodiments. If the processed signal does not match the predetermined shot sequence (step 306, "NO"), process 300 proceeds to step 310. In some embodiments, step 306 is performed by the state/event manager 234 based on the state data or the event data (e.g., the predetermined shot sequence) that is provided by the state/event database 232.

Process 300 includes incrementing a shot counter (step 308), according to some embodiments. In some embodiments, step 308 is performed by the analytics manager 240. In some embodiments, the shot counter is a shot counter for a specific time period. It should be understood that step 308 can include incrementing any number of shot counters for different time periods. For example, a lifetime shot counter may be incremented, or a hunting or tournament shot counter can be incremented as appropriate. In some embodiments, after step 308 is performed, process 300 returns to step 302 for counting of subsequent shots.

Process 300 includes determining if the processed signal matches a predetermined dryfire sequence (step 310), according to some embodiments. In some embodiments, step 310 is performed after or concurrently with step 306. In some embodiments, step 310 is performed if the results of step 306 indicate that the processed signal does not match the predetermined shot sequence. In some embodiments, step 310 is performed prior to step 306. If the processed signal matches the predetermined dryfire shot sequence (step 310, "YES"), process 300 proceeds to step 312. If the processed signal does not match the predetermined dryfire shot sequence (step 310, "NO"), process 300 returns to step 302. In some embodiments, step 310 is performed similar to step 306 but using a different predetermined sequence (e.g., the dryfire shot sequence instead of the shot sequence). In some embodiments, step 310 is performed, similarly to step 306, by the state/event manager 234 based on the state data or the event data (e.g., the predetermined dryfire shot sequence) that is provided by the state/event database 232. Advantageously, the systems and methods described herein can be configured to discriminate between a shot and a dryfire shot and can count shots and dryfires separately.

Process 300 includes incrementing a dryfire shot counter (step 312), according to some embodiments. In some embodiments, step 312 is performed by the analytics manager 240. In some embodiments, the dryfire shot counter is a lifetime dryfire shot counter, or a dryfire shot counter for a specific time period. In some embodiments, the dryfire shot counter is a hidden value or a hidden parameter that is stored in memory 231 of the controller 202 but that is not provided to the user. In some embodiments, the dryfire shot counter can be accessed and viewed by a manufacturer for warranty purposes (e.g., to identify if the bow 100 has been used improperly by excessive dryfires).

In some embodiments, process 300 can facilitate distinguishing between normal shooting operations and dryfire events based on known activity of the bow 100 for a normal shooting operation versus a dryfire event. For example, when the bow 100 is fired normally or appropriately (e.g., with an arrow), the bow 100 may absorb approximately 15-20% of stored energy, which can be detected by the accelerometers 212 and/or the gyroscopes 214 and determined as an appropriate shooting action based on the comparison between the processed signal and the predetermined shot sequence (e.g., step 306). In some embodiments, when the bow 100 is dryfired (e.g., fired without an arrow), the bow 100 absorbs approximately 100% of the energy, which can be detected by the accelerometers 212 and/or the gyroscopes 214 and determined as a dryfire shot based on the comparison between the processed signal and the predetermined dryfire sequence (e.g., step 310). In some embodiments, process 300 further includes steps to identify or detect derailing actions (e.g., when the string is forced off the cam of the bow 100 by user error).

Leveling Process

Figure 10:
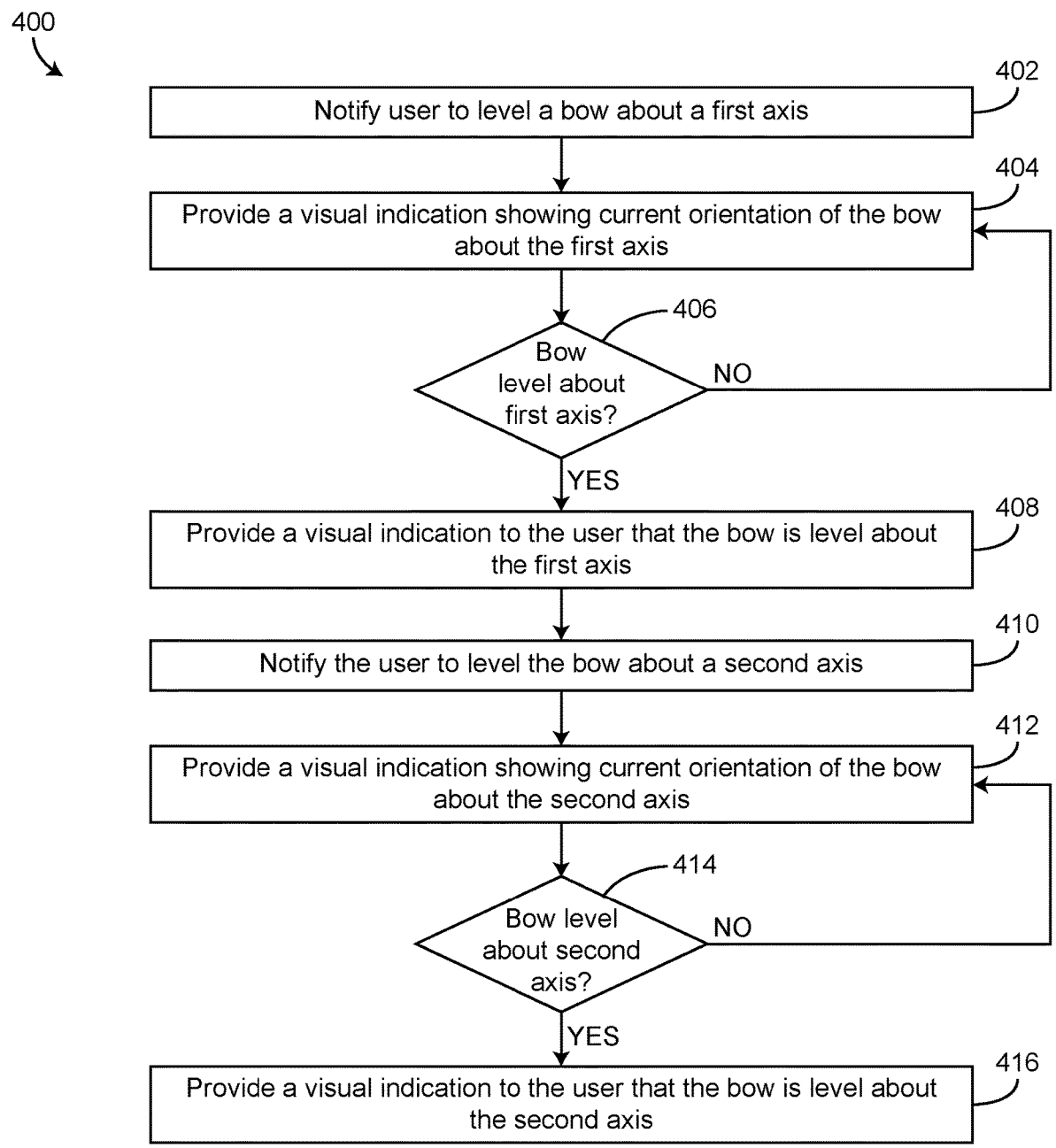
FIG. 10 is a flow diagram of a process for guiding a user to level a bow, according to some embodiments.

Referring particularly to FIG. 10, a process 400 for leveling a bow is shown, according to some embodiments. In some embodiments, process 400 is performed by the sensor and processing system 200 as described in greater detail above with reference to FIGS. 2-8. In some embodiments, process 400 is performed when the controller 202, or more generally, the sensor and processing system 200, or more generally the bow 100, is transitioned into the leveling mode 246 as described in greater detail above with reference to FIGS. 4 and 5. For example, process 400 can be initiated when the bow 100 is transitioned into the leveling mode 246 (e.g., in response to a user input provided via the user interface 218). Process 400 can advantageously be performed to facilitate a semi-autonomous or an automatically guided process for the user to level the bow 100 (e.g., for servicing the bow 100).

Process 400 includes notifying a user to level a bow about a first axis (step 402), according to some embodiments. In some embodiments, step 402 is performed by the interface manager 242 and the user interface 218 (e.g., more specifically, the display screen 224). In some embodiments, the notification is a visual notification that is provided to the user, prompting the user to level the bow about a first axis (e.g., an X-axis).

Process 400 includes providing a visual indication showing a current orientation of the bow about the first axis (step 404), according to some embodiments. In some embodiments, step 404 is performed by the interface manager 242 and the user interface 218 or more specifically, by the display screen 224. In some embodiments, the current orientation of the bow about the first axis is a current value as measured by one of the gyroscopes 214 (e.g., the gyroscope 214 that is configured to measure angular orientation about the first axis). In some embodiments, the visual indication is an angular value (e.g., in positive or negative degrees).

Process 400 includes determining if the bow is level about the first axis (step 406), according to some embodiments. In some embodiments, if the bow is not level about the first axis (step 406, "NO"), process 400 returns to step 404 until the user levels the bow about the first axis. In some embodiments, if the bow is level about the first axis (step 406, "YES"), process 400 proceeds to step 408. In some embodiments, determining if the bow is level about the first axis includes determining a difference between the current orientation or angular position of the bow about the first axis and a level orientation value or angular position (e.g., a value of zero degrees), and determining if the difference is substantially equal to zero. In some embodiments, if the difference is not substantially equal to zero, this indicates that the bow is not level about the first axis. Likewise, if the difference is substantially equal to zero, this indicates that the bow is now level about the first axis. In some embodiments, step 406 is performed by the analytics manager 240 by comparing an angular orientation value received as the sensor data to a corresponding level value. In some embodiments, the difference as determined in step 406 for determining if the bow is level about the first axis is also displayed on the display screen 224 as a part of step 404. In this way, step 404 can also include providing the user a visual indication of how unlevelled the bow is about the first axis.

Process 400 includes providing a visual indication to the user that the bow is level about the first axis (step 408), according to some embodiments. In some embodiments, step 408 is performed by the display screen 224 of the user interface 218 and/or the personal computer device 220. In some embodiments, step 408 is performed by changing a color on the display screen 224 (e.g., from red to green) to provide a visual indication to the user that the bow is level about the first axis.

Process 400 includes notifying the user to level the bow about a second axis (step 410) and providing a visual indication showing a current orientation of the bow about the second axis (step 412), according to some embodiments. In some embodiments, steps 410 and 412 are the same as or similar to steps 402 and 404. Similarly, process 400 includes determining if the bow is level about the second axis (step 414), in response to determining that the bow is not level about the second axis (step 414, "NO") returning to step 412, or in response to determining that the bow is level about the second axis (step 414, "YES"), proceeding to step 416 to provide a visual indication to the user that the bow is level about the second axis. In some embodiments, steps 414 and 416 are the same as or similar to steps 406 and 408 but for the second axis instead of the first axis. In some embodiments, process 400 includes additional steps of notifying the user to level the bow about a third axis, providing a visual indication showing current orientation of the bow about the third axis, determining if the bow is level about the third axis, and providing a visual indication to the user that the bow is level about the third axis once the bow is level about the third axis.

Shot Learning Process

Figure 11:
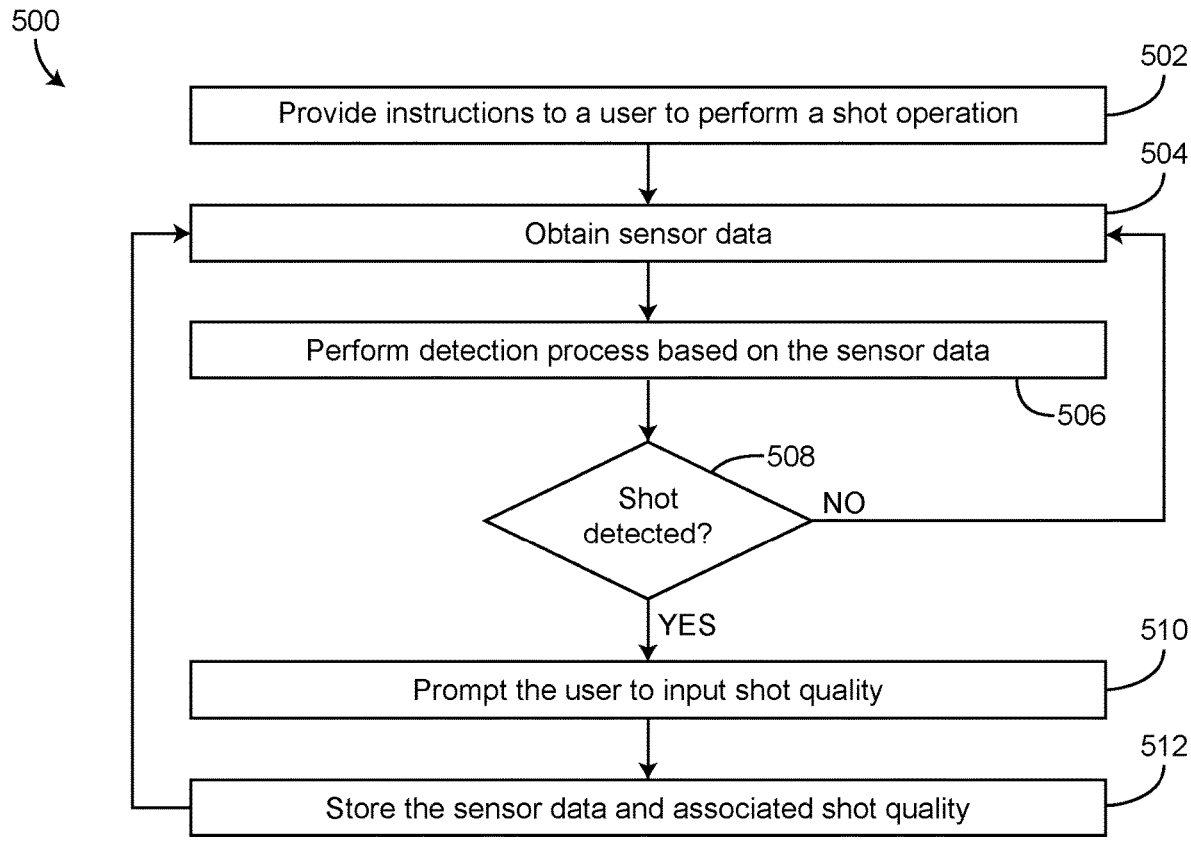
FIG. 11 is a flow diagram of a process for guiding a user through a shot process and obtaining shot quality to collect training data, according to some embodiments.

Referring particularly to FIG. 11, a process 500 for obtaining training data of a user's shot is shown, according to some embodiments. In some embodiments, process 500 is performed by the sensor and processing system 200 to obtain training data (e.g., sensor data) for generation of a shot profile. In some embodiments, process 500 is performed to obtain training data including sensor data from performing a shot, and an associated quality of the shot. Process 500 includes steps 502-512, according to some embodiments, which can be performed by the controller 202, or processing circuitry of the sensor and processing system 200.

Process 500 includes providing instructions to a user to perform a shot operation (step 502), according to some embodiments. In some embodiments, the instructions are provided as a notification, a prompt, etc. For example, the instructions can be provided to the user via the display screen 224 (e.g., a visual notification prompting the user to take a shot using the bow 100). In some embodiments, the instructions are provided to the user via the personal computer device 220.

Process 500 includes obtaining sensor data (step 504), according to some embodiments. In some embodiments, step 504 is performed by polling the accelerometers 212 and/or gyroscopes to obtain angular accelerations and/or angular orientation values, measurements, etc. In some embodiments, step 504 is performed until a shot is detected (e.g., steps 506-508). In some embodiments, the sensor data is obtained from various sensors of the bow over a time period until a shot is taken by the user.

Process 500 includes performing a detection process based on the sensor data (step 506), according to some embodiments. In some embodiments, the detection process performed at step 506 includes performing process 300 as described in greater detail above with reference to FIG. 9, or specific steps of process 300 (e.g., steps 302-306). In some embodiments, step 506 is performed by the state/event manager 234 using state data or event data and sensor data obtained in step 504. For example, step 504 can include comparing the sensor data to sensor data of a shot event, and determining if a shot has occurred based on the comparison. In some embodiments, shots are detected based on an analytical technique, a machine learning technique, or a neural network. For example, step 506 can include analyzing the sensor data obtained in step 504 for significant spikes or rapid increases in angular acceleration, followed by a decay (e.g., indicating that the bow has fired a shot).

Process 500 includes determining if a shot has been detected (step 508), according to some embodiments. In some embodiments, step 508 includes using results of step 506. If a shot has not yet been detected (step 508, "NO"), process 500 returns to step 504 and continues collecting and analyzing sensor data (e.g., performing steps 504 and 506). If a shot has been detected (step 508, "YES"), process 500 proceed to step 510, according to some embodiments.

Process 500 includes prompting the user to input a shot quality (step 510), according to some embodiments. In some embodiments, step 510 is performed by the interface manager 242 of the controller 202 and the user interface 218 of the sensor and processing system 200. In some embodiments, step 510 is performed by the controller 202 and the personal computer device 220. For example, the prompt may be a request provided to the user via the display screen 224 or the personal computer device 220 to enter the shot quality via the input devices 226 and/or via the personal computer device 220. In some embodiments, the shot quality is a binary value (e.g., "good" and "bad"), or a rating (e.g., on a scale of 1-10), or an indication of accuracy off the shot.

Process 500 includes storing the sensor data and the associated shot quality (step 512), according to some embodiments. In some embodiments, step 512 is performed to store the sensor data of the shot, one or more parameters or characteristics of the sensor data when the shot is taken, etc., and the shot quality associated therewith as input or provided by the user. In some embodiments, the sensor data and associated shot quality for a single shot is a single "data point" or "dataset" for a training set. Process 500 can be repeated multiple times to obtain additional data points or datasets to obtain a sufficient training set of data for generating, populating, determining, etc., a shot or user profile so that newly taken shots and data obtained can be used to identify if the newly taken shots are good or bad shots, and to determine improvements for the user to become a better archer.

Action Detection

Figure 12:
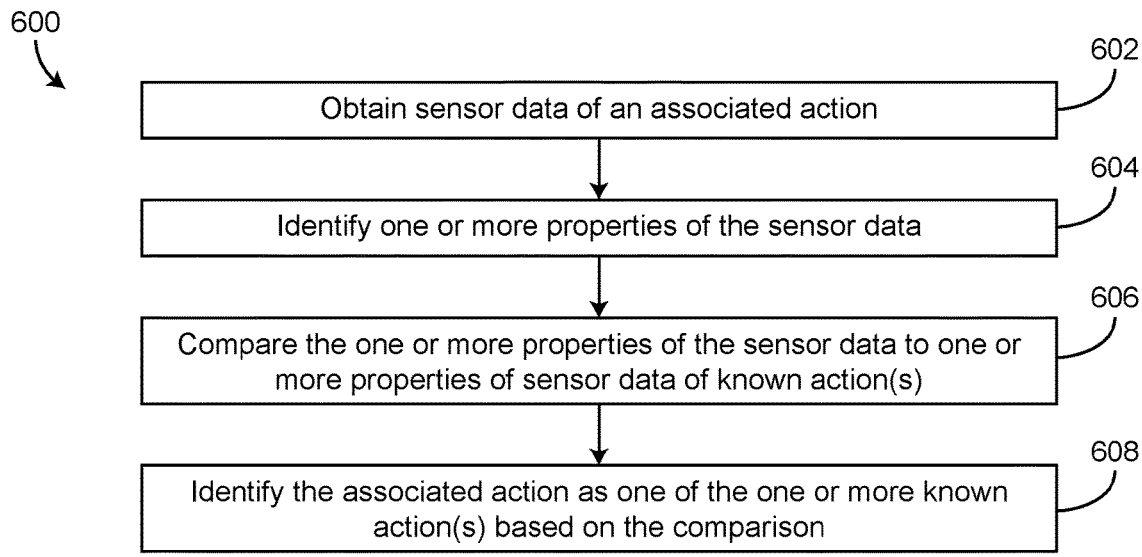
FIG. 12 is a flow diagram of a process for identifying a type of action performed by a user of a bow, according to some embodiments.

Referring particularly to FIG. 12, a process 600 for identifying an action performed with the bow based on sensor data is shown, according to some embodiments. Process 600 includes steps 602-608 and can be performed by processing circuitry of the sensor and processing system 200, or more specifically, by the state/event manager 234 of the controller 202, according to some embodiments.

Process 600 includes obtaining sensor data of an associated action (step 602), according to some embodiments. Step 602 can include polling the accelerometers 212 and/or the gyroscopes 214 to obtain sensor data over a time period when the associated action is performed, according to some embodiments. The sensor data may be angular orientation and/or angular acceleration about one or more (e.g., three) axes of a bow, according to some embodiments. In some embodiments, step 602 is performed by the state/event manager 234.

Process 600 includes identifying one or more properties of the sensor data (step 604), according to some embodiments. In some embodiments, step 604 is performed by the state/event manager 234. In some embodiments, the one or more properties are peak accelerations, average accelerations, variance of angular orientation or acceleration, etc., or any other variables of the sensor data that are characteristic of the associated action. For example, in the case of a shot, the properties may include identifying a rapid increase in angular acceleration (e.g., vibrations) over a time period, followed by a characteristic period of decay as the vibrations are dissipated through the bow.

Process 600 includes comparing the one or more properties of the sensor data to one or more properties of sensor data of known actions (step 606), according to some embodiments. In some embodiments, step 606 is performed by comparing the properties or characteristics of the sensor data to similar properties or characteristics of the known actions to identify if the properties or characteristics of the sensor data match the properties or characteristics of the known action. In some embodiments, step 606 is performed by the state/event manager 234 based on the sensor data obtained from the accelerometers 212 and/or the gyroscopes 214 and the state data or event data obtained from the state/event database 232. In some embodiments, step 606 includes comparing the properties or characteristics of the sensor data to multiple different properties or characteristics of different known actions.

Process 600 includes identifying the associated actions as one of the one or more known actions based on the comparison of step 606 (step 608), according to some embodiments. In some embodiments, step 608 is performed when the one or more properties or characteristics of the sensor data are determined to match (e.g., be substantially equal to) the one or more properties or characteristics of one of the one or more known actions. For example, if the one or more properties or characteristics are within a specific range of values of the various properties or characteristics of the known actions, the associated action can be identified as a corresponding one of the known actions. In some embodiments, step 608 is performed by the state/event manager 234.

In some embodiments, process 600 illustrates the functionality of the state/event manager 234 of the controller 202. In some embodiments, the state/event manager 234 can perform process 600 in real-time (e.g., based on real-time sensor data) to identify one or more actions, events, or states of the bow 100.

Training Process

Figure 13:
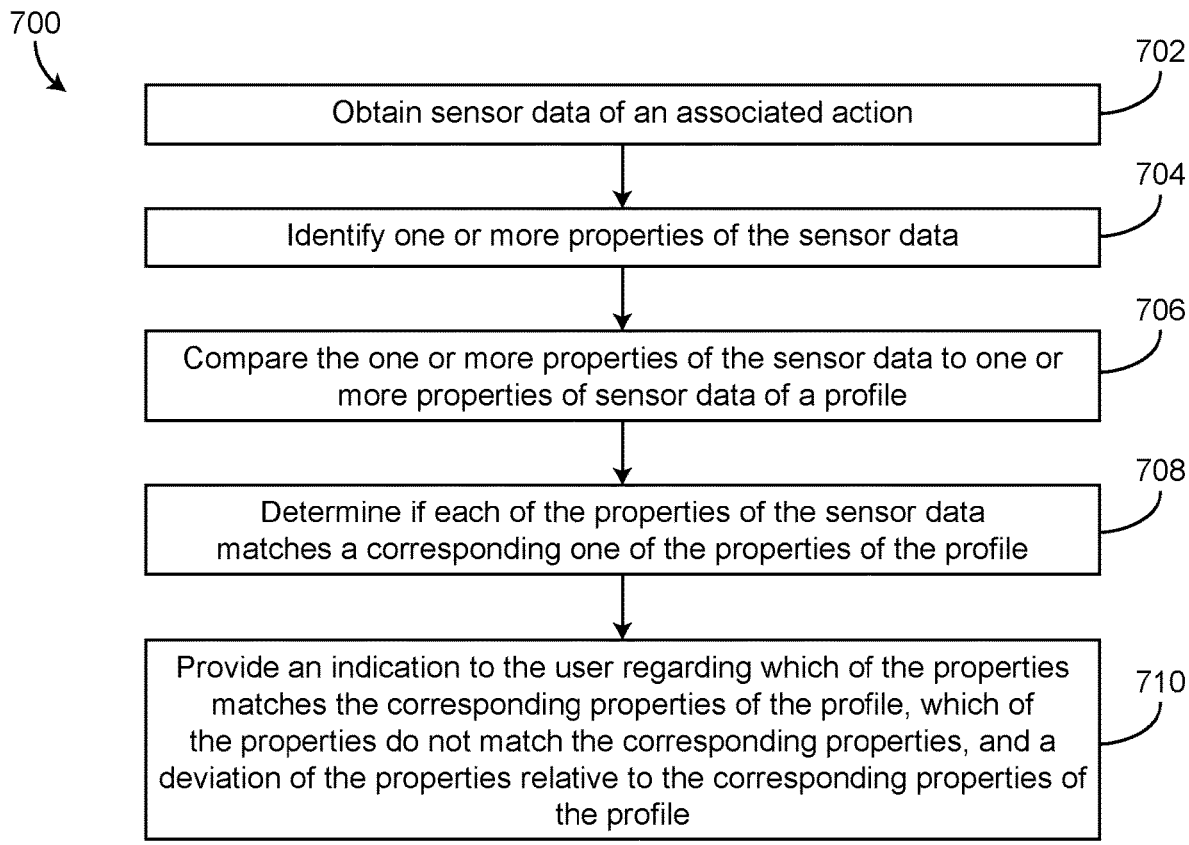
FIG. 13 is a flow diagram of a process for operating a smart bow to train a user to improve their archery skills, according to some embodiments.

Referring particularly to FIG. 13, a process 700 for training or teaching a user to improve their archery skills is shown, according to some embodiments. In some embodiments, process 700 is performed autonomously by the sensor and processing system 200. In some embodiments, process 700 is performed to facilitate teaching the user to improve their archery skills by providing positive reinforcement, form suggestions, identifying mistakes that the user makes when shooting the bow, etc. Process 700 includes steps 702-710, according to some embodiments.

Process 700 includes obtaining sensor data of an associated action (step 702), according to some embodiments. In some embodiments, step 702 is similar to the step 602 of process 600. Process 700 also includes identifying one or more properties of the sensor data (step 704), according to some embodiments. In some embodiments, step 704 is the same as or similar to the step 604 of process 600.

Process 700 also includes comparing the one or more properties of the sensor data to one or more properties of sensor data of a profile (step 706), according to some embodiments. In some embodiments, step 706 is similar to step 606 of process 600, but the comparison is performed between the properties and ideal or optimal values of the properties as defined by the profile. For example, the properties of the sensor data may be or include an aiming time and a float amount over a time period preceding shooting of the bow. The properties as provided by the profile can be optimal or ideal aiming time and optimal or ideal float amount, according to some embodiments. In some embodiments, the profile is a shot profile of the user that is constructed using sensor data from when the user performs a good shot. In some embodiments, the profile is a shot profile that is predetermined or an expert marksman profile that indicates ideal or optimal values of the properties. In some embodiments, step 706 is performed by the analytics manager 240.

Process 700 includes determining if each of the properties of the sensor data matches a corresponding one of the properties of the profile (step 708), according to some embodiments. In some embodiments, step 708 includes determining if values of the properties of the sensor data are within a range defined by the corresponding values of the properties of the profile. In some embodiments, step 708 is performed by the analytics manager 240.

Process 700 includes providing an indication to the user regarding which of the properties matches the corresponding properties of the profile, which of the properties do not match the corresponding properties, and a deviation of the properties relative to the corresponding properties of the profile (step 710), according to some embodiments. In some embodiments, step 710 includes operating the display screen 224 to provide a visual indication or notification regarding whether or not the properties match the corresponding properties of the profile. For example, if the aiming time substantially matches the ideal aiming time, the display screen 224 may be operated by the interface manager 242 to notify the user that the aiming time is optimal (e.g., by providing textual information, a green color, etc.). Similarly, if the aiming time does not match the ideal aiming time, the display screen 224 may be operated by the interface manager 242 to notify the user that the aiming time exceeds or is less than the ideal aiming time, and the deviation (e.g., a magnitude of the deviation, and/or a direction, such as "Aiming time 2 seconds too long" or "Aiming time 1 second too short"). In some embodiments, the properties that do not match the corresponding properties and the deviations thereof are presented as suggestions to minimize the deviation such as "Try aiming longer" or "Try aiming shorter" or "Try steadying the bow before releasing" etc.

Profile Generation Process

Figure 14:
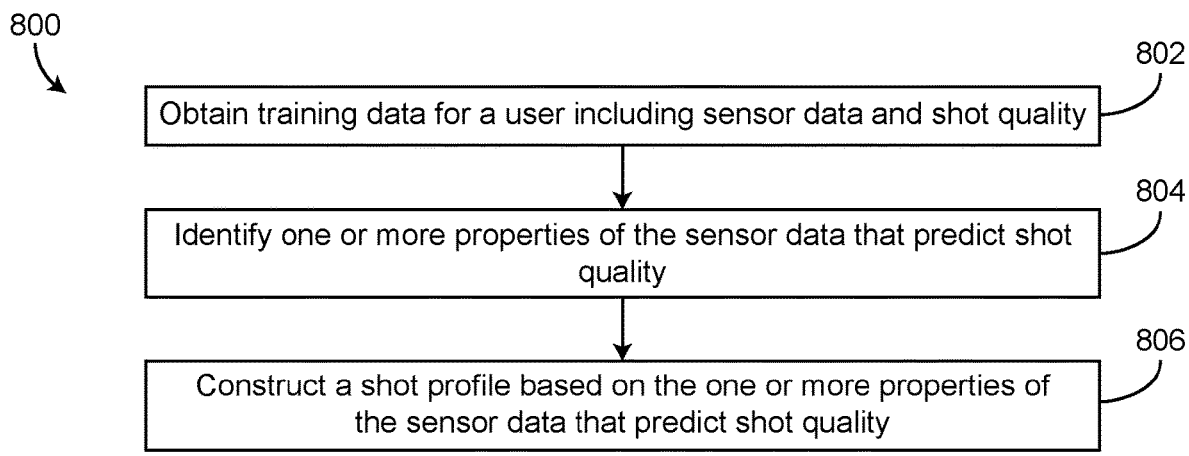
FIG. 14 is a flow diagram of a process for generating a shot profile for a user, according to some embodiments.

Referring particularly to FIG. 14, a process 800 for generating a shot profile is shown, according to some embodiments. In some embodiments, the process 800 is performed to generate the profile that is used in process 700. In some embodiments, the process 800 includes steps 802-806 and can be performed by the profile generator 238.

Process 800 includes obtaining training data for a user including sensor data and shot quality (step 802), according to some embodiments. In some embodiments, the training data is data obtained from performing process 500 multiple times. In some embodiments, step 802 includes performing process 500 at least once or multiple times to obtain the training data. In some embodiments, step 802 includes retrieving the training data from a database where the training data is stored (e.g., the database may be populated by performing process 500 multiple times to generate the training data).

Process 800 includes identifying one or more properties of the sensor data that predict shot quality (step 804), according to some embodiments. In some embodiments, step 804 includes performing a statistical analysis, a regression technique, using a neural network, a correlation technique, etc., to identify a correlation between specific properties that predict the shot quality (e.g., included in the training data obtained at step 802). In some embodiments, step 804 is performed by the profile generator 238 using any of the techniques described in greater detail above with reference to FIG. 6. Step 804 can be performed to identify one or more properties, variables, parameters, characteristics, etc., that predict good shot quality (e.g., a good shot) or that predict poor shot quality (e.g., a bad shot).

Process 800 includes constructing a shot profile based on the one or more properties of the sensor data that predict shot quality (step 806), according to some embodiments. In some embodiments, step 806 includes averaging values of the properties that are identified in step 804 to predict shot quality, and tagging them or ranking them in order of importance for predicting shot quality (e.g., a strength of correlation between the properties and the shot quality). In some embodiments, step 806 also includes determining a range or an acceptable amount of deviation of the one or more properties of the sensor data that predict shot quality. In some embodiments, step 806 is performed by the profile generator 238 of the controller 202.

Power Saving Mode

Figure 15:
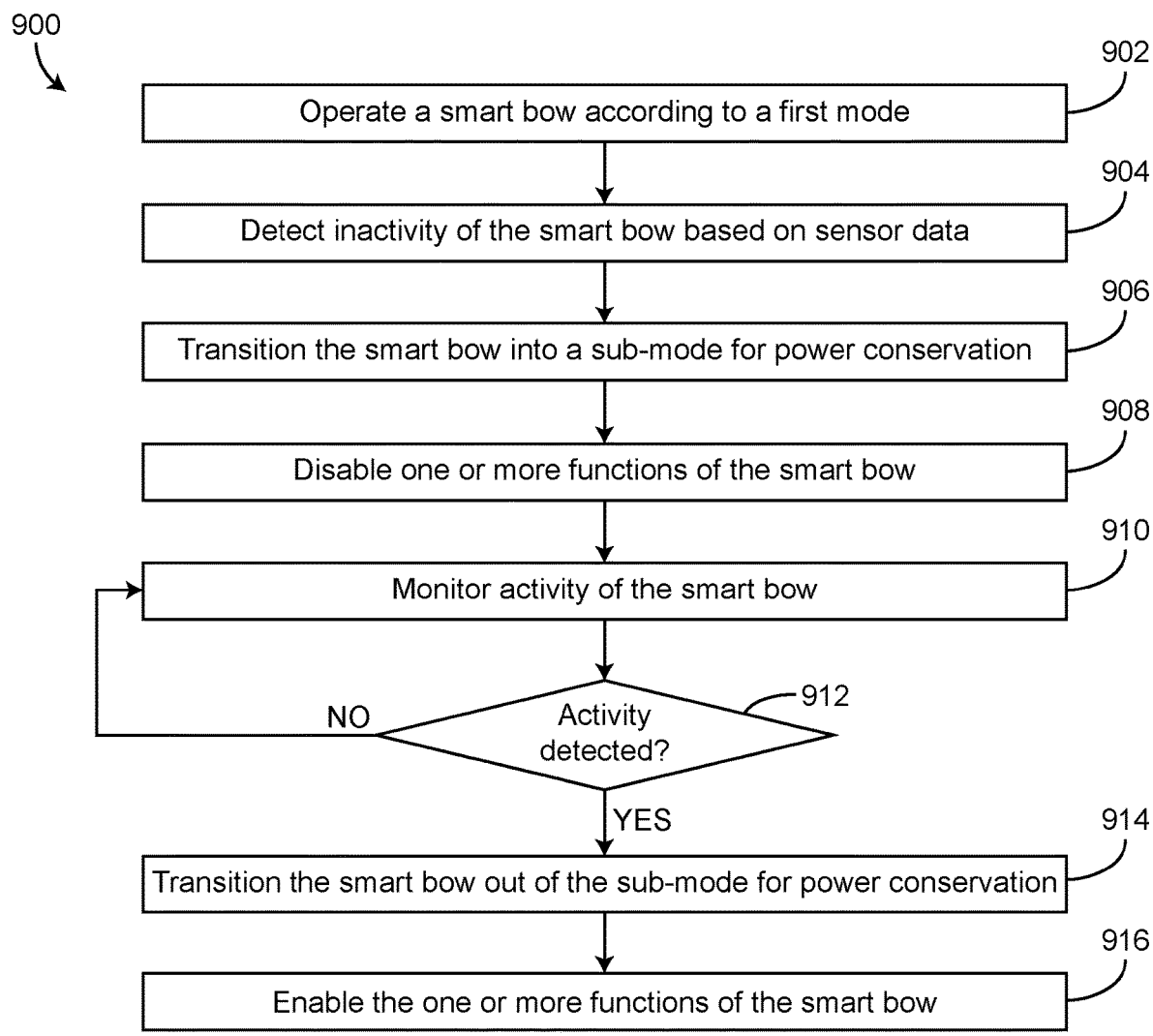
FIG. 15 is a flow diagram of a process for operating a smart bow according to a power saving mode, as a sub-mode of another mode, according to some embodiments.

Referring particularly to FIG. 15, a process 900 for conserving power at a smart bow (e.g., the bow 100 equipped with the sensor and processing system 200) is shown, according to some embodiments. Process 900 includes steps 902-916 and can be performed by the sensor and processing system 200 to conserve power or reduce energy consumption of the power source 208 when various functionality or smart-features of the smart bow are not required, according to some embodiments. In some embodiments, the process 900 includes a low power or sub-mode for power conservation to improve energy efficiency of the smart bow, and thereby increase a battery life.

Process 900 includes operating a smart bow according to a first mode (step 902), according to some embodiments. In some embodiments, step 902 is performed by the analytics manager 240 and/or the interface manager 242. In some embodiments, the first mode of step 902 is any of the leveling mode 246, the vibration performance mode 248, the aim game mode 259, the shot learning mode 250, the training mode 252, the tournament mode 254, or the hunting mode 256. In some embodiments, the power saving functionality as described herein can be performed when the smart bow (e.g., the bow 100 equipped with the sensor and processing system 200) operates according to any of the modes described herein.

Process 900 includes detecting inactivity of the smart bow based on sensor data (step 904), according to some embodiments. In some embodiments, inactivity is identified or detected based on detected motion (or lack thereof) of the smart bow. For example, step 904 can include polling and monitoring sensor data from the accelerometers 212 and/or the gyroscopes 214, and determining if the smart bow does not move or is inactive for a predetermined time period. In some embodiments, if the sensor data from the accelerometers 212 and/or the gyroscopes 214 indicates that the smart bow has not moved for a certain amount of time (e.g., five minutes) this may indicate that the smart bow is inactive or is not currently being used by the user. In some embodiments, step 904 is performed by the mode manager 236 and/or the analytics manager 240.

Process 900 includes transitioning the smart bow into a sub-mode for power conservation (step 906), according to some embodiment. In some embodiments, step 906 is performed if inactivity is detected at step 904. If inactivity is not detected at step 906, the smart bow may continue operating according to the first mode without transitioning the bow into the sub-mode. In some embodiments, the sub-mode for power conservation is the power saving mode 257. In some embodiments, step 906 is performed in response to a user input or a user request to operate according to a low power mode.

Process 900 includes disabling one or more functions of the smart bow (step 908), according to some embodiments. In some embodiments, step 908 is performed to disable one or more functions of the smart bow that are not required when inactivity of the bow is detected, and which are significant consumers of electrical energy. For example, step 908 can include polling only one of the accelerometers 212 and/or gyroscopes 214 in order to detect activity at the smart bow and disable the sub-mode. In some embodiments, disabling the one or more functions includes disabling wireless transmissions of the smart bow, decreasing a lighting of a display screen of the smart bow, reducing a polling frequency of sensors of the bow, etc.

Process 900 includes monitoring activity of the smart bow (step 910) and determining if activity is detected (step 912), according to some embodiments. In some embodiments, step 910 includes monitoring activity of the smart bow by monitoring sensor data received from an accelerometer and/or a gyroscope to detect motion. If motion is detected (step 912, "YES"), process 900 proceeds to step 914. If motion is not detected (step 912, "NO"), process 900 returns to step 910 and continues monitoring activity of the bow until it is detected that the smart bow is being actively used (e.g., in response to motion detection). Steps 910 and 912 can be performed by the mode manager 236, according to some embodiments.

Process 900 includes transitioning the bow out of the sub-mode for power conservation (step 914) and enabling one or more functions of the smart bow (step 916), according to some embodiments. In some embodiments, step 916 includes re-activating or re-enabling any of the functions that are disabled in step 908. In some embodiments, process 900 proceeds to continue operating according to the first mode in response to performing steps 914 and 916.

Tournament Process

Figure 16:
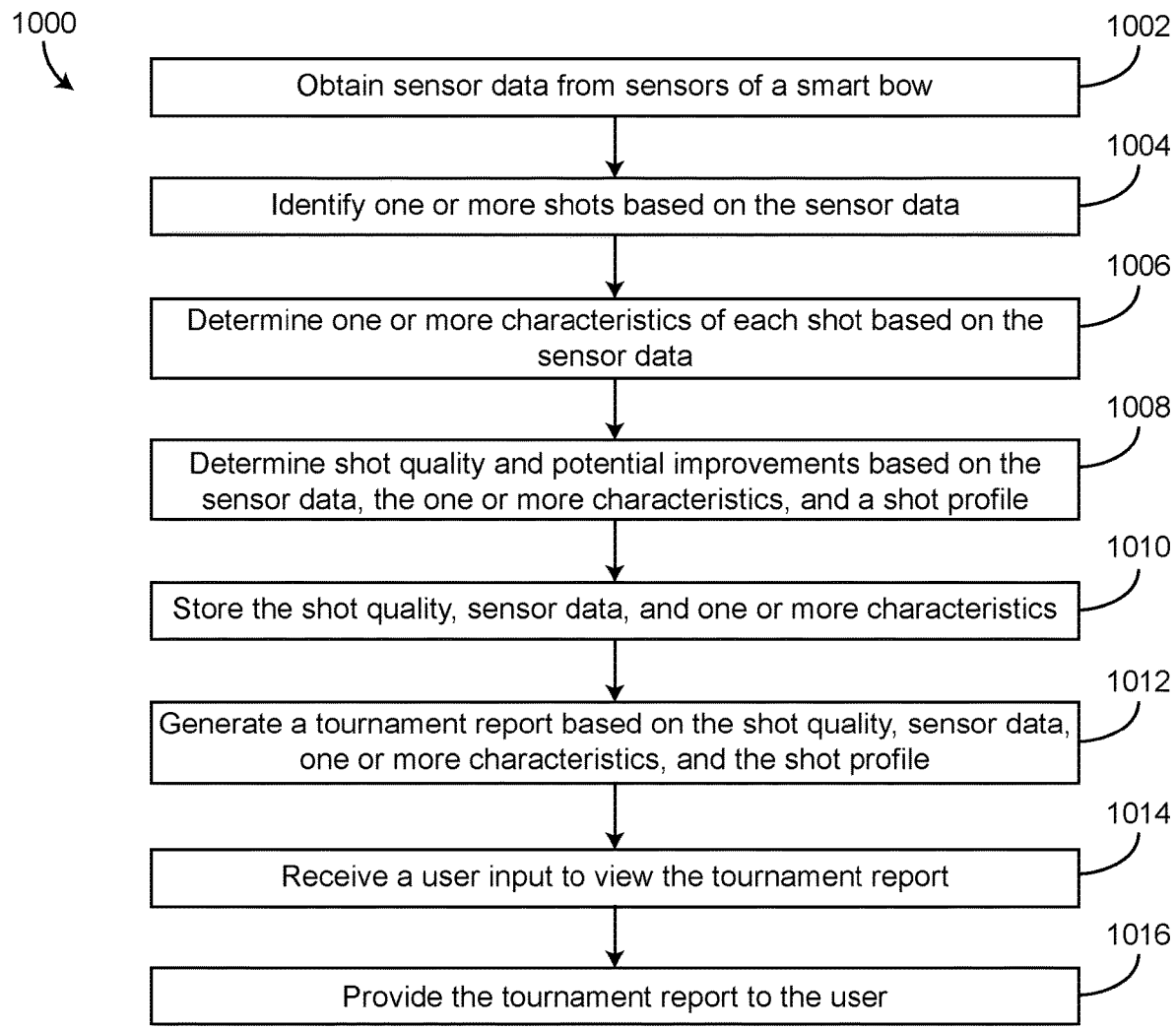
FIG. 16 is a flow diagram of a process for operating a smart bow according to a tournament mode, according to some embodiments.

Referring particularly to FIG. 16, a process 1000 for operating a smart bow (e.g., the bow 100 equipped with the sensor and processing system 200) to collect data during a tournament and generate a tournament report is shown, according to some embodiments. In some embodiments, process 1000 can be performed to facilitate providing analytic or reporting data to the user similar to the shot learning mode 250 or the process 700, but in a delayed manner so that the user receives a report of an entire tournament after completion of the tournament. Process 1000 includes steps 1002-1016 and can be performed by the bow and sensor system 200 as described in greater detail above to facilitate providing the user a full and in-depth analysis of each shot taken during a tournament.

Process 1000 includes obtaining sensor data from sensors of a smart bow (step 1002) and identifying one or more shots based on the sensor data (step 1004), according to some embodiments. In some embodiments, the sensor data obtained from the sensors of the smart bow is angular orientation and/or angular acceleration data obtained from the accelerometers 212 and/or the gyroscopes 214. For example, the sensor data can be time-series data of the accelerometers 212 and/or the gyroscopes 214 that initiates or begins once the user transitions the bow into a tournament mode at the beginning of the tournament. In some embodiments, step 1002 includes recording all data from the sensors (e.g., the accelerometers 212 and/or the gyroscopes 214) over an entirety of the tournament. In some embodiments, step 1002 includes recording and storing data (e.g., time series data) of the sensors collected over the tournament for use in generating a tournament report to present to the user after the tournament is completed.

Identifying the one or more shots based on the sensor data (step 1004) can include performing process 300 as described in greater detail above with reference to FIG. 9, or performing process 600 as described in greater detail above with reference to FIG. 12. In some embodiments, the sensor data or signals obtained from the sensors are analyzed to detect shots taken with the smart bow. In some embodiments, identifying the shots also includes generating a timestamp for each of the shots taken so that sensor data preceding, following, or during the shot can be analyzed in greater detail.

Process 1000 includes determining one or more characteristics of each shot based on the sensor data (step 1006) and determining shot quality and potential improvements based on the sensor data, the one or more characteristics, and a shot profile (step 1008), according to some embodiments. In some embodiments, the one or more characteristics are parameters, variables, or characteristics of the sensor data that are known to or determined to predict shot accuracy such as aiming float, aiming time, orientation of the smart bow prior to release of the bowstring, etc. In some embodiments, step 1006 is performed by the analytics manager 240 or the state/event manager 234. In some embodiments, steps 1006 and 1008 include performing process 600 as described in greater detail above with reference to FIG. 12. In some embodiments, steps 1006 and 1008 include performing process 700 as described in greater detail above with reference to FIG. 13. In some embodiments, the shot profile is a user-specific profile that is generated by previous performance process 800 and/or process 500 as described in greater detail above with reference to FIGS. 14 and 11, respectively.

Process 1000 includes storing the shot quality, the sensor data, and the one or more characteristics of each shot identified in step 1004 (step 1010), according to some embodiments. In some embodiments, step 1010 is performed by the analytics manager 240 by storing the shot quality, the sensor data, and the one or more characteristics of each identified shot in the database 266. In some embodiments, the data stored in step 1010 is retrievable for use in generating a report or for presentation to a user.

Process 1000 includes generating a tournament report based on the shot quality, the sensor data, the one or more characteristics, and the shot profile (step 1012), according to some embodiments. In some embodiments, the tournament report is a visual representation of the shot quality, the sensor data, and the one or more characteristics of each identified shot relative to the shot profile. For example, the tournament report can include a graphical representation, charts, etc., of the shot quality, the sensor data, and the one or more characteristics of each shot taken during the tournament. In some embodiments, the tournament report can include different break-downs showing changes in form that the user can perform to improve their shot qualities. For example, the tournament report may show average aiming time, average float, average angular orientation of the bow prior to release of the bowstring, etc. In some embodiments, the tournament report may also highlight a "best shot" and a "worst shot" taken over the tournament. For example, the best shot may be one of the identified shots with characteristics having values closest to ideal values of the characteristics as defined by the shot profile. Similarly, the worst shot may be one of the identified shots with characteristics having values farthest from ideal values of the characteristics as defined by the shot profile.

Process 1000 includes receiving a user input to view the tournament report (step 1014) and providing the tournament report to the user (step 1016), according to some embodiments. In some embodiments, the user input is provided after the tournament is completed. In some embodiments, the user input is received via a user interface of the smart bow, or via a smartphone or personal computer device (e.g., a smartphone that is wireless communicably coupled with the smart bow). In some embodiments, the tournament report can be provided to the user for display by the interface manager 242 and/or the wireless manager 244. For example, the interface manager 242 can provide display data to the display screen 224 of the user interface 218, or the wireless manager 244 can provide wireless data to the personal computer device 220 or the remote system 222 for display on the personal computer device 220.

Hunting Process

Figure 17:
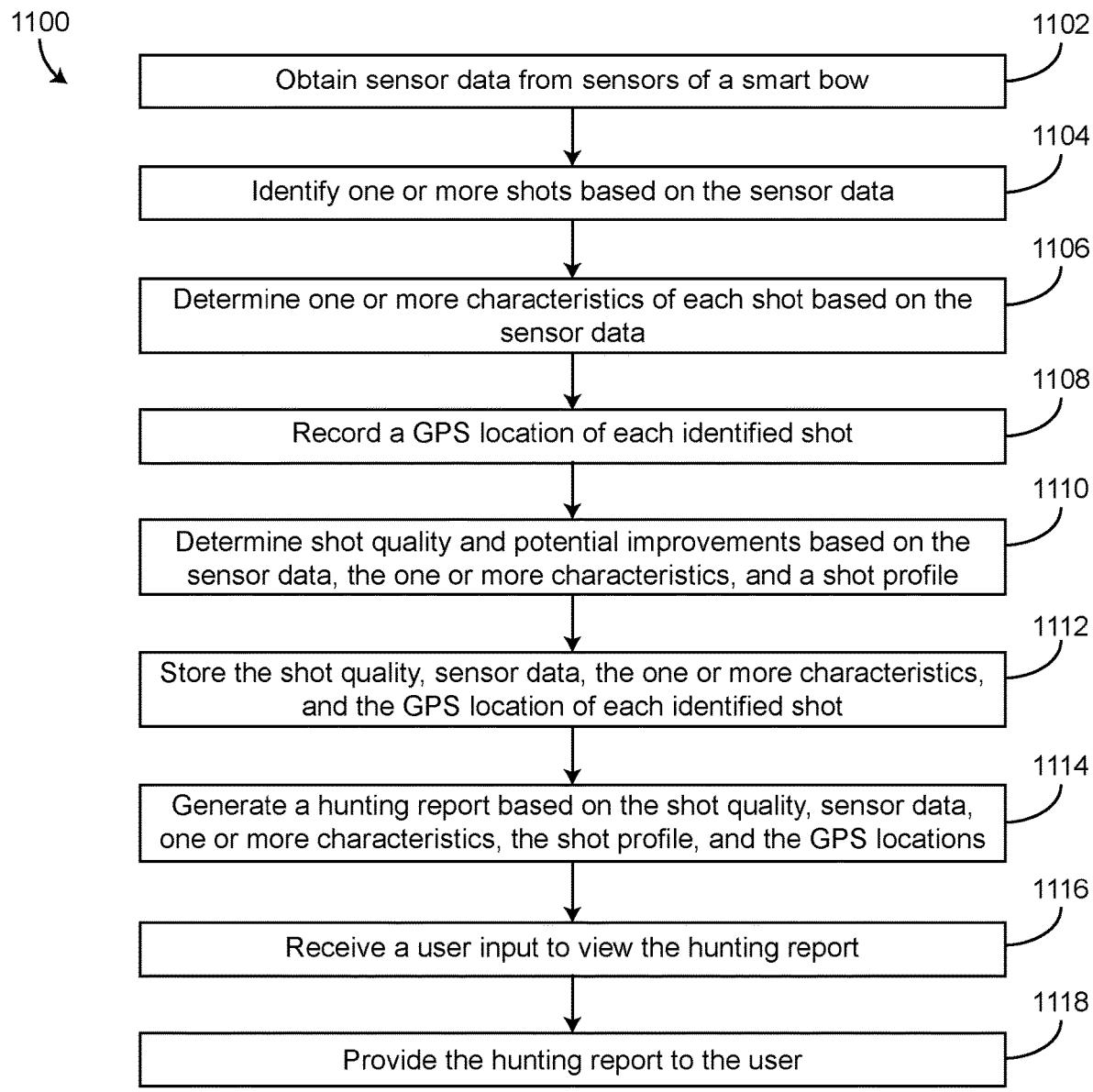
FIG. 17 is a flow diagram of a process for operating a smart bow according to a hunting mode, according to some embodiments.
Figure 18:
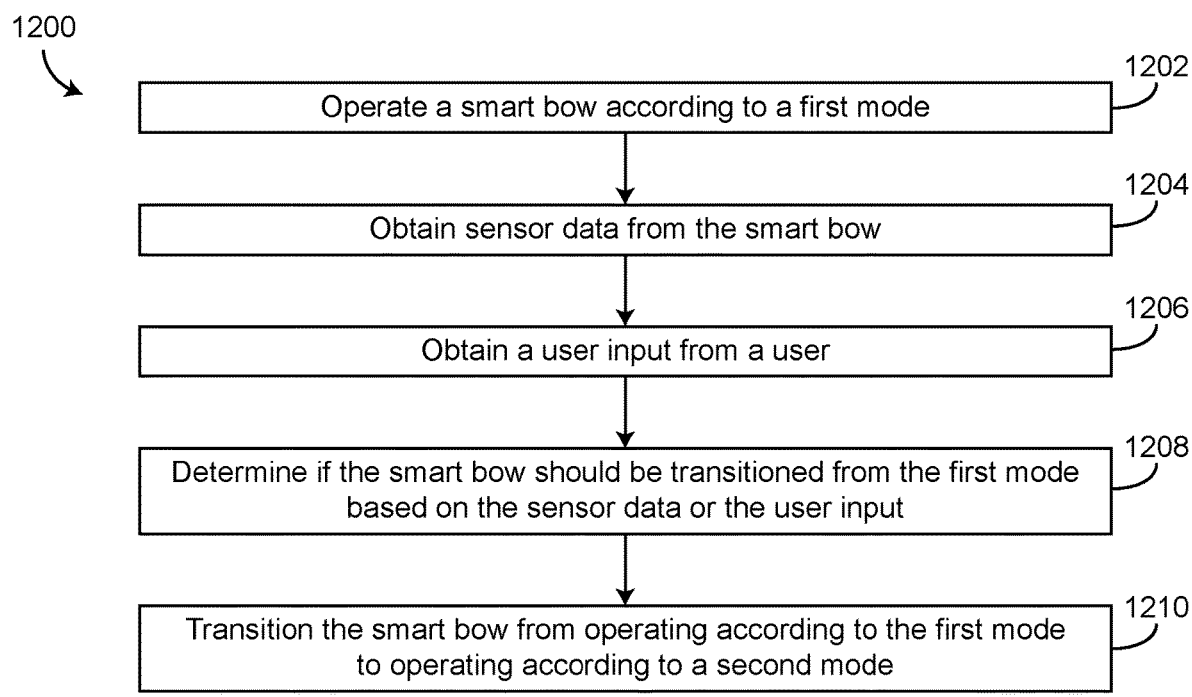
FIG. 18 is a flow diagram of a process for transitioning a smart bow between a variety of different predetermined modes based on sensor data and a user input, according to some embodiments.

Referring particularly to FIG. 17, a process 1100 for operating a smart bow for a hunting mode is shown, according to some embodiments. Process 1100 includes steps 1102-1118 and can be performed by the sensor and processing system 200 for the bow 100, according to some embodiments. In some embodiments, the process 1100 is the same as or similar to the process 1000 as described in greater detail above with reference to FIG. 16. In particular, steps 1102-1106 can be the same as or similar to steps 1002-1006 of process 1000, and steps 1110-1118 can be the same as or similar to steps 1008-1016 of process 1000, but additionally using GPS location data, and with a lower number of shots (e.g., the number of shots taken over a hunting trip is expected to be lower than a number of shots taken during a tournament).

Process 1100 may differ from process 1000 in that process 1100 uses GPS data, according to some embodiments. Process 1100 includes recording a GPS location of each identified shot (step 1108), according to some embodiments. In some embodiments, each time a shot is taken (e.g., as identified in step 1104), a GPS location of the shot is recorded and stored for use in generating the hunting report. In some embodiments, step 1108 is performed by the GPS 203, or based on a GPS location provided by the GPS 203 at a time at which each shot is taken. The GPS location can be obtained by the analytics manager 240 and stored in the database 266, according to some embodiments.

Process 1100 includes generating a hunting report based on the shot quality, the sensor data, the one or more characteristics, the shot profile, and the GPS locations (step 1114), according to some embodiments. In some embodiments, the hunting report is the same as or similar to the tournament report of process 1000. In some embodiments, the hunting report also includes a geographical map with different indicators that show where a shot was taken. In some embodiments, the geographical map is provided as a heat map, with different colors to indicate areas that shots were taken. In some embodiments, the different indicators correspond to a shot being taken. In some embodiments, the map further includes indicators that correspond to GPS locations where the user saw an animal but did not perform a shot operation. In this way, the indicators (e.g., flags, dots, stars, etc., or any other visual indicator on a map) can be generated with associated GPS data based on sensor data (e.g., when the user shoots the bow) or based on a user input. In some embodiments, the hunting report can be transferred wirelessly to the remote system 222 for access at a later date (e.g., when the user plans a next hunting trip and wishes to see which geographical areas are preferable hunting areas).

Mode Transition Process

Figure 19:
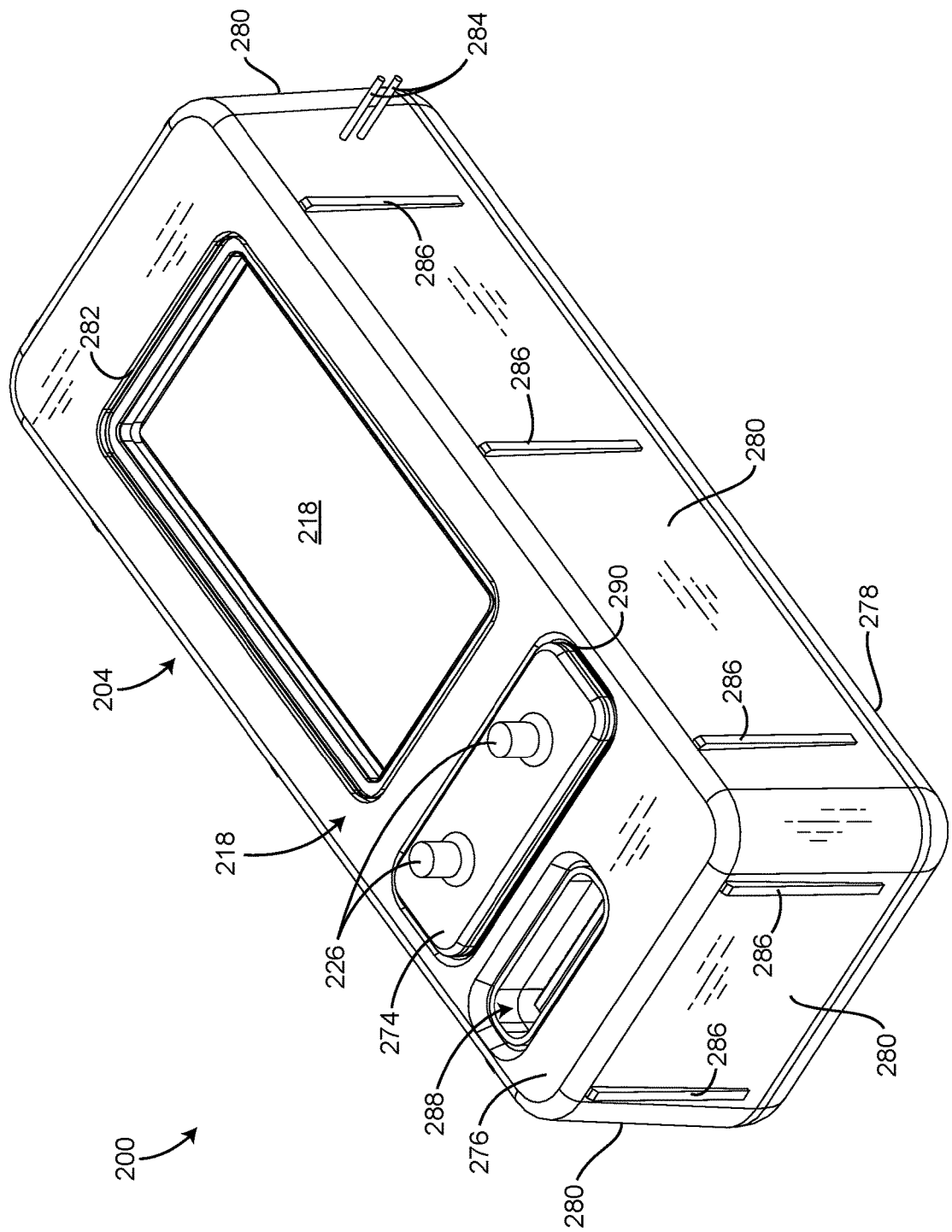
FIG. 19 is a perspective view of a modular housing of the sensor and processing system of FIG. 2, according to some embodiments.
Figure 20:
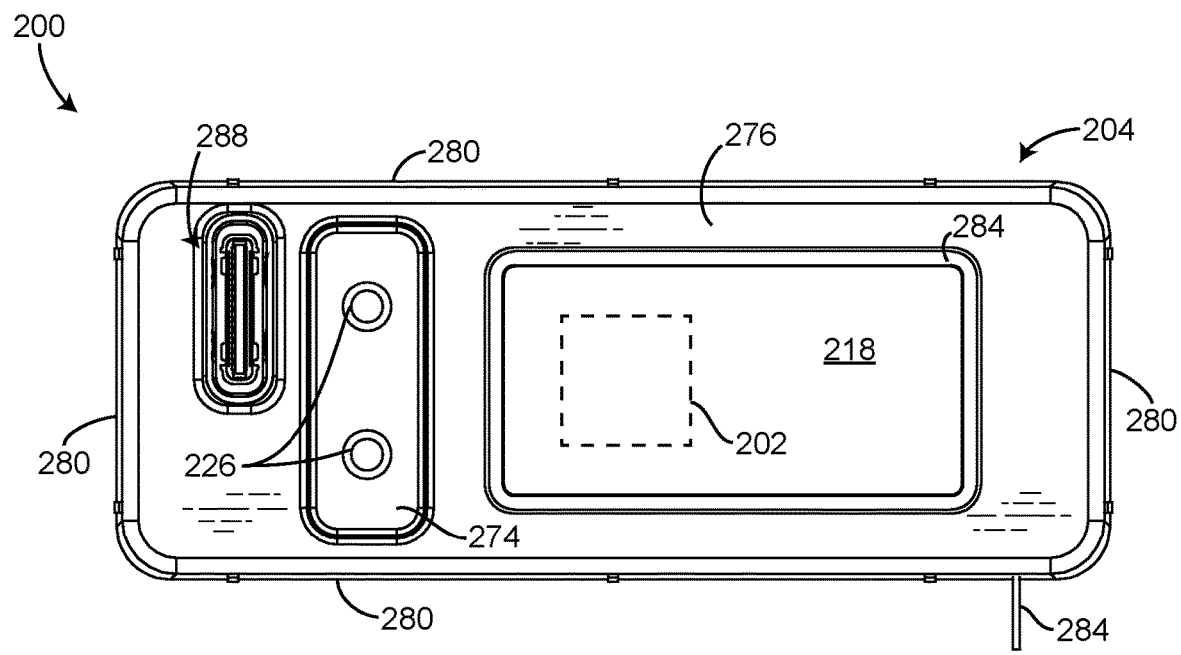
FIG. 20 is a top view of the modular housing of FIG. 19, according to some embodiments.
Figure 21:
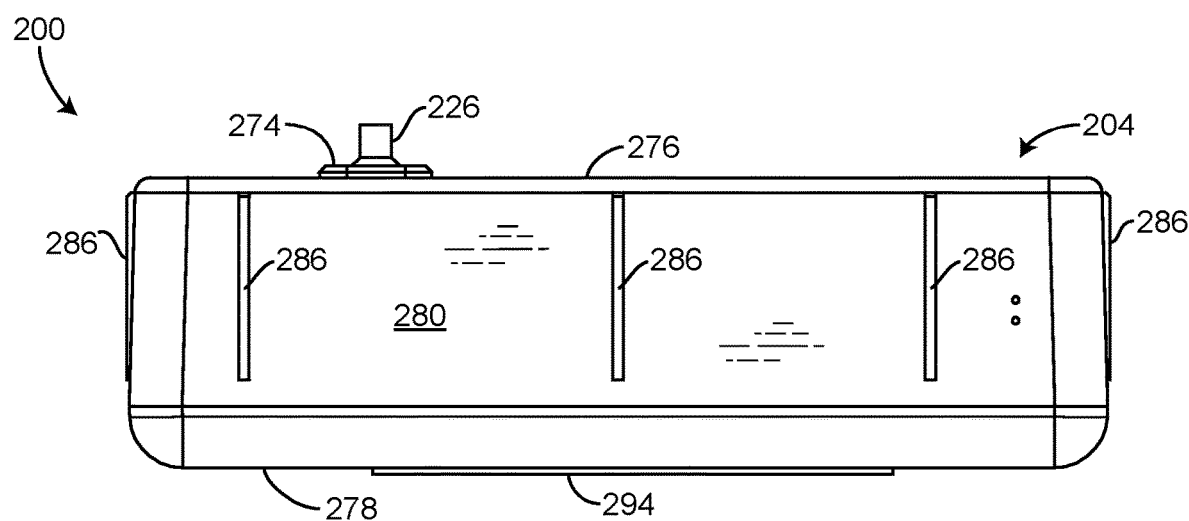
FIG. 21 is a side view of the modular housing of FIG. 19, according to some embodiments.

Referring particularly to FIG. 19, a process 1200 for transitioning a smart bow between different modes of operation is shown, according to some embodiments. In some embodiments, process 1200 is performed by the image and processing system 200 to transition between different modes. Process 1200 includes steps 1202-1210, according to some embodiments.

Process 1200 includes operating a smart bow according to a first mode (step 1202), according to some embodiments. In some embodiments, the first mode is a regular mode of operation. In some embodiments, step 1202 is performed by the controller 202. In some embodiments, the first mode is any of the leveling mode 246, the vibration performance mode 248, the power saving mode 257, the aim game mode 259, the shot learning mode 250, the training mode 252, the tournament mode 254, and the hunting mode 256.

Process 1200 includes obtaining sensor data from the smart bow (step 1204) and obtaining a user input from a user (step 1206), according to some embodiments. In some embodiments, step 1204 is performed similarly to step 1102, step 1002, step 802, step 702, step 602, or step 504 of processes 1100, 1000, 800, 700, 600, or 500 as described in greater detail above. The sensor data can be the angular orientation and/or angular acceleration of the smart bow about a variety of different axes, according to some embodiments.

Process 1200 includes determining if the smart bow should be transitioned from the first mode based on the sensor data or the user input (step 1208), according to some embodiments. In some embodiments, step 1208 is performed by the mode manager 236. In some embodiments, step 1208 includes performing the functionality of the state/event manager 234 to determine a detected state/event based on the sensor data. In some embodiments, step 1208 includes determining if the bowstring has been drawn on the smart bow. For example, if the detected state/event indicates that the bowstring of the smart bow has been drawn, this may indicate that the smart bow should be transitioned into a different mode. In some embodiments, step 1208 is also performed based on which of the modes the first mode is. For example, if the detected state or event indicates that the smart bow should be transitioned into a particular mode, but the smart bow is already in the particular mode, then the smart bow can be maintained in the particular mode. In some embodiments, step 1208 is performed based on the user input. For example, the user input may indicate a desired mode as provided by the user, into which the smart bow should be transitioned.

Process 1200 includes transitioning the smart bow from operating according to the first mode to operating according to a second mode (step 1210), according to some embodiments. In some embodiments, step 1210 includes de-activating the first profile and activating the second profile. In some embodiments, step 1210 is performed by the mode manager 236 to configure the analytics manager 240 and the interface manager 242 to operate according to the second mode. In some embodiments, the second mode can be any of the leveling mode 246, the vibration performance mode 248, the power saving mode 257, the aim game mode 259, the shot learning mode 250, the training mode 252, the tournament mode 254, or the hunting mode 256.

Remote Processing

Referring again to FIG. 3, it should be understood that any of the functionality of the controller 202 as described through the present application can be distributed at least partially to a remote processing system (e.g., the remote system 222). For example, any of the detection processes, profile generation techniques, etc., described herein may be performed on the remote system 222 based on sensor data obtained and provided by the controller 202 (e.g., via wireless communication facilitated between the controller 202 and the remote system 222 via the wireless transceiver 216). In some embodiments, any of the functionality of the controller 202 as described throughout the present application is performed in a distributed manner amongst the processing circuitry of any of the controller 202, the personal computer device 220, or the remote system 222.

User Data

Referring to FIGS. 4 and 6, the analytics manager 240 can be configured to store various user data in the database 266, according to some embodiments. In some embodiments, the user data includes usernames, passwords, name of the user, a serial number of the bow 100, etc. In some embodiments, the user data is stored at least partially on the personal computer device 220. For example, as described in greater detail above, the personal computer device 220 can use a mobile application that configures the personal computer device 220 to communicate wirelessly with the controller 202. In some embodiments, the controller 202 is configured to sync with the personal computer device 220, and provides the serial number of the bow 100 (stored in the memory 231 of the controller 202) to the personal computer device 220 for storage and/or authentication.

Modular Housing Structure

Referring to FIGS. 19-22, the modular housing 204 within which at least a portion of the sensor and processing system 200 is implemented is shown, according to some embodiments. The modular housing 204 includes a face plate 276 (e.g., a first surface, a front surface, a front face, a face, a plate, a top, etc.), a back plate 278 (e.g., a second surface, a rear surface, a rear face, a face, a plate, a back, a bottom, etc.), and sides 280 that extend between the face plate 276 and the back plate 278 to define the modular housing 204, according to some embodiments. The face place 276 includes an opening 282 (e.g., a hole, a window, a border, an aperture, a bezel, etc.) through which the user interface 218 (e.g., a display screen, an LED screen, an LCD screen, etc.) is viewable by the user, according to some embodiments. The face plate 276 also includes the input devices 226 positioned on a member 274 that extends through an opening 290 of the face plate 276, according to some embodiments.

In some embodiments, the face plate 276 also includes a data port 288 (e.g., an opening, a USB port, etc.) for establishing communication between the controller 202 and the personal computer device 220, the remote system 222, or any other external device (e.g., for configuring the controller 202, for downloading data from the controller 202, etc.). In some embodiments, the data port 288 is wiredly coupled with the controller 202. The user interface 218 is also wiredly coupled with the controller 202, according to some embodiments. In some embodiments, the sides 280 include ribs 286 (e.g., protrusions, extrusions, flanges, etc.) that extend outwards from the sides 280. The ribs 286 may be configured to interlock or interface with corresponding geometry of an interior portion of the grip 116 of the bow 100.

The modular housing 204 also includes wires 284 that extend through openings in the sides 280 and provide power to the controller 202, the user interface 218, the input devices 226, etc., or more generally, provide power to any of the components of the sensor and processing system 200 that are positioned on or within the modular housing 204, or that communicate with the controller 202. In some embodiments, the wires 284 are configured to facilitate communications or power transfer between the controller 202 (or any other components of the sensor and processing system 200) and the power sources 208. In some embodiments, the wires 284 are electrically coupled with the power source 208. The modular housing 204 also includes a strip of adhesive 294 that is positioned along the back plate 278 and configured to facilitate coupling of the modular housing 204 with a corresponding surface of the grip 116.

Figure 22:
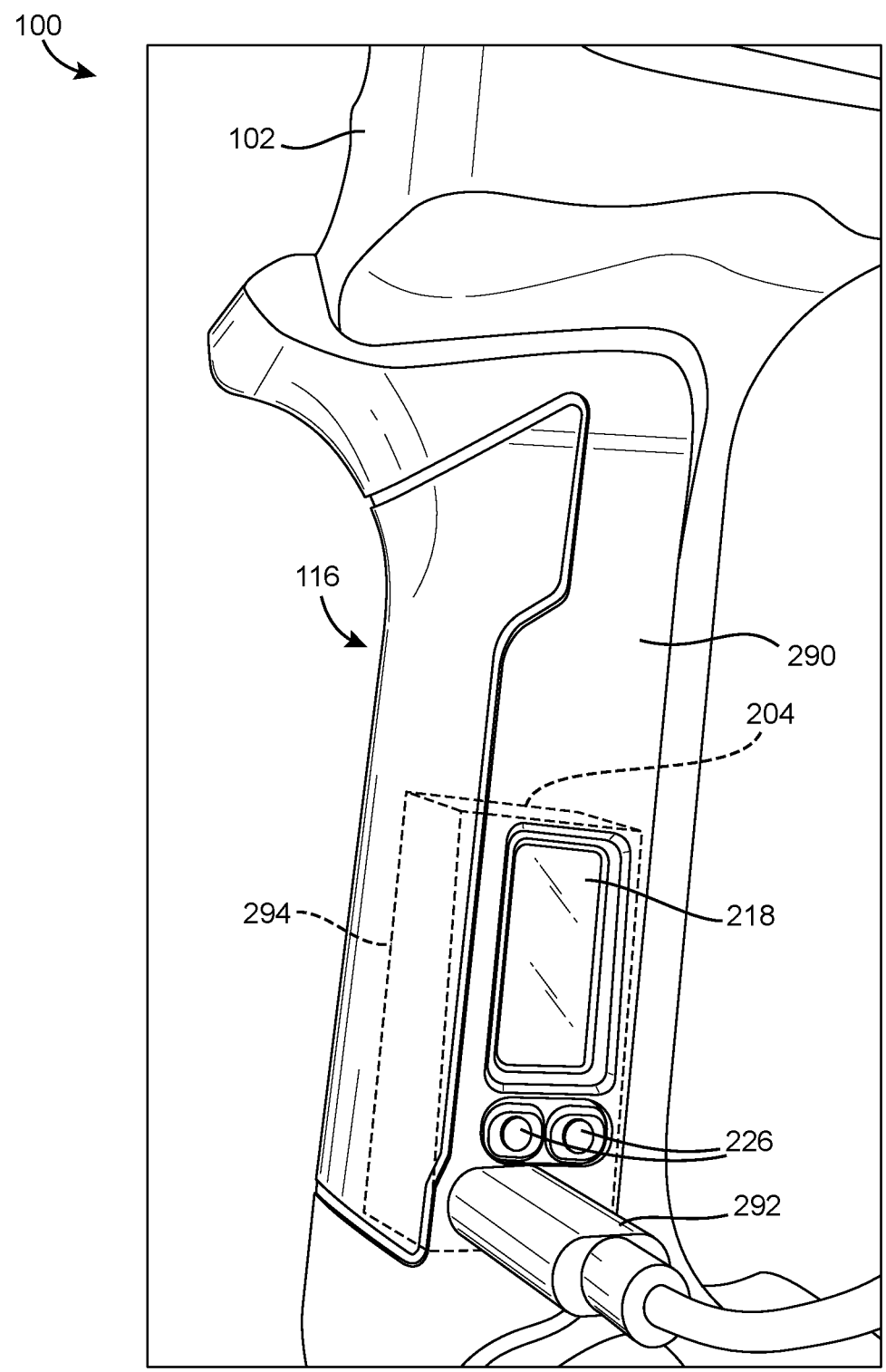
FIG. 22 is a perspective view of the modular housing of FIG. 19 installed in a handgrip of the bow of FIG. 1, according to some embodiments.

Referring particularly to FIG. 22, the modular housing 204 can be positioned within an inner volume 294 of the grip 116. The adhesive 294 may engage, abut, or directly contact an interior surface of the grip 116 that defines the inner volume 294. The ribs 286 engage, interlock with, abut, directly contact, etc., corresponding interior surfaces of the grip 116 that define the inner volume 294 and facilitate coupling the modular housing 204 with the grip 116. The modular housing 204 is positioned within the grip 116, with the data port 288, the user interface 218, and the input devices 226 being accessible from an exterior of the grip 116.

The grip 116 may include a rubber member, an overmold, etc., shown as cover 290. The cover 290 of the grip 116 extends over a portion of the modular housing 204 and may retain the modular housing 204 within the grip 116. In some embodiments, the cover 290 includes an opening or windows so that the user interface 218, the data port 288, and the input devices 226 are accessible by the user of the bow 100. The data port 288 may be accessible by a cable 292 to communicably connect the controller 202 with an external device, according to some embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for a smart bow, the system comprising:
   an accelerometer configured to measure acceleration of the smart bow;
   a gyroscope configured to measure orientation of the smart bow;
   a user interface; and
   processing circuitry configured to:
      receive the acceleration of the smart bow from the accelerometer and the orientation of the smart bow from the gyroscope;
      perform an analysis on the acceleration and the orientation of the smart bow by comparing measurements of at least one of the acceleration or the orientation to known characteristics of a plurality of particular actions to identify which of the plurality of particular actions has been performed with the smart bow; and
      operate the user interface to display a result of the analysis.

2. The system of claim 1, wherein the accelerometer, the gyroscope, the user interface, and the processing circuitry are positioned within a modular housing that is fixedly coupled with a structure of the smart bow.

3. The system of claim 1, wherein the measurements comprise at least one of time-series data of the acceleration or time-series data of the orientation, and the known characteristics of the plurality of particular actions comprise time-series data of the plurality of particular actions.

4. The system of claim 1, wherein the processing circuitry is configured to detect at least one of a shot action of the smart bow, a drawing action of a string of the smart bow, or a dryfire shot action based on the acceleration of the smart bow received from the accelerometer and the orientation of the smart bow received from the gyroscope.

5. The system of claim 4, wherein the processing circuitry is configured to increment a shot counter in response to detecting the shot action, and increment a dryfire shot counter in response to detecting the dryfire shot action.

6. A smart bow comprising:
an accelerometer;
a gyroscope;
a user interface;
processing circuitry configured to:
  obtain time-series acceleration data from the accelerometer and time-series orientation data from the gyroscope;
  compare the time-series acceleration data and the time-series orientation data with known time-series data of a particular action to determine whether the particular action has been performed; and
  in response to determining that the particular action has been performed, operate the user interface to provide analytic data of the particular action performed with the smart bow, the analytic data comprising a characteristic of the particular action determined based on the time-series acceleration data and the time-series orientation data; and
a modular housing within which the accelerometer, the gyroscope, the user interface, and the processing circuitry are positioned, the modular housing fixedly coupled with a structure of the smart bow.

7. The smart bow of claim 6, wherein the modular housing is positioned within a handgrip of the smart bow.

8. The smart bow of claim 6, wherein the modular housing has a size less than or equal to 2 inches in height, less than or equal to 1 inch in width, and less than or equal to 0.75 inches in depth.

9. The smart bow of claim 6, wherein the processing circuitry is configured to wirelessly communicate with a smartphone or a remote system to provide data regarding the particular action performed with the smart bow.

10. The smart bow of claim 6, wherein the processing circuitry is configured to operate according to a plurality of different modes.

11. The smart bow of claim 10, wherein the plurality of different modes comprise at least one of:
  a bow leveling mode for guiding a user to level the smart bow;
  a shot learning mode for learning a profile of an accurate shot;
  a training mode for training the user to improve archery skills;
  a tournament mode for recording data during a tournament;
  a hunting mode for recording data during a hunting trip;
  a vibration performance mode for determining and reporting an amount of vibration present at the smart bow;
  a power saving mode for reducing power consumption of the processing circuitry; and
  a game mode for training the user to improve archery in a gamified manner.

12. The smart bow of claim 11, wherein in the power saving mode, the processing circuitry is configured to:
  detect activity or inactivity of the smart bow based on at least one of the time-series acceleration data and the time-series orientation data;
  in response to detecting the inactivity, disable one or more functions of the smart bow to conserve power consumption; and
  in response to detecting the activity, enable the one or more functions of the smart bow.

13. The smart bow of claim 11, wherein in the bow leveling mode, the processing circuitry is configured to:
  operate the user interface to provide a notification to the user to level the smart bow about a first axis and provide a visual indication showing a current orientation of the smart bow about the first axis;
  determine, based on the time-series orientation data obtained from the gyroscope, whether the smart bow is leveled about the first axis; and
  in response to the smart bow being level about the first axis, operate the user interface to notify the user that the smart bow is level about the first axis.

14. The smart bow of claim 11, wherein in the shot learning mode, the processing circuitry is configured to:
  obtain the time-series acceleration data from the accelerometer and the time-series orientation data from the gyroscope over a time period when the user performs a shot using the smart bow;
  obtain a user input indicating a shot quality of the shot;
  generate a shot profile based on a relationship between the shot quality and the time-series acceleration data and the time-series orientation data; and
  predict a second shot quality of a second shot based on the shot profile, the time-series acceleration data, and the time-series orientation data gathered when the user performs the second shot using the smart bow.

15. The smart bow of claim 11, wherein in the training mode, the processing circuitry is configured to:
  obtain the time-series acceleration data from the accelerometer and the time-series orientation data from the gyroscope over a time period when the user performs a shot;
  compare one or more properties of the shot based on the time-series acceleration data and the time-series orientation data to one or more properties of a profile associated with an accurate shot of the user; and
  operate the user interface to provide a result of comparing the one or more properties of the shot with the one or more properties of the profile.

16. The smart bow of claim 11, wherein in the tournament mode, the processing circuitry is configured to:
  identify one or more shots based on the time-series acceleration data and the time-series orientation data performed during a competition;
  determine a quality of each shot and one or more characteristics of each shot based on the time-series acceleration data and the time-series orientation data;
  store the quality of each shot, the one or more characteristics of each shot, and the time-series acceleration data and the time-series orientation data of each shot in memory of the smart bow; and
  generate a tournament report using the quality of each shot, the time-series acceleration data, and the time-series orientation data.

17. The smart bow of claim 11, wherein in the hunting mode, the processing circuitry is configured to:
  identify one or more shots based on the time-series acceleration data and the time-series orientation data performed during the hunting trip;
  record a geographic location of each shot in memory of the smart bow; and
  generate a hunting report based on the geographic location of each shot.

18. The smart bow of claim 11, wherein in the vibration performance mode, the processing circuitry is configured to:

determine, based on at least one of the time-series acceleration data or the time-series orientation data, a first degree of vibration of the smart bow when the smart bow is shot without an accessory installed;

determine, based on at least one of the time-series acceleration data or the time-series orientation data, a second degree of vibration of the smart bow when the smart bow is shot with the accessory installed; and operate the user interface to notify the user regarding the second degree of vibration or a relative increase or decrease of vibration of the smart bow between the first degree and the second degree of vibration.

19. The smart bow of claim 11, wherein in the game mode, the processing circuitry is configured to:

obtain the time-series acceleration data from the accelerometer and the time-series orientation data from the gyroscope over a time period when the user performs at least one shot;

identify one or more properties of the at least one shot based on the time-series acceleration data and the time-series orientation data;

compare the one or more properties of the at least one shot to one or more properties of a profile associated with an accurate shot of the user;

generate a score for the user based on the comparison between the one or more properties of the at least one shot and the one or more properties of the profile; and operate the user interface to present the score to the user.

20. A modular unit for a smart bow, the modular unit comprising:

an accelerometer;

a gyroscope;

a user interface;

processing circuitry configured to:

obtain acceleration data from the accelerometer and orientation data from the gyroscope;

detect an action performed with the smart bow based on the acceleration data and the orientation data; and operate the user interface to provide analytic data of the action performed with the smart bow, the analytic data comprising a characteristic of the action determined based on the acceleration data and the orientation data; and a housing within which the accelerometer, the gyroscope, the user interface, and the processing circuitry are positioned;

wherein the modular unit is configured to be positioned within an inner volume of a handgrip of the smart bow with the user interface accessible to a user of the smart bow.

* * * * *